(12) United States Patent
Yu et al.

(10) Patent No.: US 10,769,493 B2
(45) Date of Patent: Sep. 8, 2020

(54) METHOD AND APPARATUS FOR NEURAL NETWORK TRAINING AND CONSTRUCTION AND METHOD AND APPARATUS FOR OBJECT DETECTION

(71) Applicants: BEIJING KUANGSHI TECHNOLOGY CO., LTD., Beijing (CN); MEGVII (BEIJING) TECHNOLOGY CO., LTD., Beijing (CN)

(72) Inventors: Jiahui Yu, Beijing (CN); Qi Yin, Beijing (CN)

(73) Assignees: BEIJING KUANGSHI TECHNOLOGY CO., LTD., Beijing (CN); MEGVII (BEIJING) TECHNOLOGY CO., LTD., Beijing (CN)

(*) Notice: Subject to any disclaimer, the term of this patent is extended or adjusted under 35 U.S.C. 154(b) by 310 days.

(21) Appl. No.: 15/660,494

(22) Filed: Jul. 26, 2017

(65) Prior Publication Data

US 2018/0032840 A1 Feb. 1, 2018

(30) Foreign Application Priority Data

Jul. 27, 2016 (CN) .......................... 2016 1 0605759

(51) Int. Cl.
*G06K 9/00* (2006.01)
*G06K 9/62* (2006.01)
(Continued)

(52) U.S. Cl.
CPC ....... *G06K 9/6256* (2013.01); *G06K 9/00288* (2013.01); *G06K 9/6267* (2013.01);
(Continued)

(58) Field of Classification Search
None
See application file for complete search history.

(56) References Cited

U.S. PATENT DOCUMENTS 9,373,057 B1 * 6/2016 Erhan .................. G06K 9/6202
10,198,671 B1 * 2/2019 Yang ...................... G06T 11/60
(Continued)

FOREIGN PATENT DOCUMENTS

| CN | 104680508 | 6/2015 |
| CN | 105512624 | 4/2016 |
| CN | 105760859 | 7/2016 |

OTHER PUBLICATIONS

Second Office Action, issued in the corresponding Chinese patent application No. 201610605759.1, dated May 17, 2019, 31 pages.
(Continued)

*Primary Examiner* — Vikkram Bali
(74) *Attorney, Agent, or Firm* — Hamre, Schumann, Mueller & Larson, P.C.

(57) ABSTRACT

The embodiments of the present invention provide training and construction methods and apparatus of a neural network for object detection, an object detection method and apparatus based on a neural network and a neural network. The training method of the neural network for object detection, comprises: inputting a training image including a training object to the neural network to obtain a predicted bounding box of the training object; acquiring a first loss function according to a ratio of the intersection area to the union area of the predicted bounding box and a true bounding box, the true bounding box being a bounding box of the training object marked in advance in the training image; and adjusting parameters of the neural network by utilizing at least the first loss function to train the neural network.

7 Claims, 8 Drawing Sheets

(51) Int. Cl.
*G06T 7/11* (2017.01)
*G06T 7/33* (2017.01)
*G06N 3/08* (2006.01)

(52) U.S. Cl.
CPC ............... *G06N 3/08* (2013.01); *G06T 7/11* (2017.01); *G06T 7/337* (2017.01); *G06K 9/00268* (2013.01); *G06T 2207/20084* (2013.01); *G06T 2207/20132* (2013.01); *G06T 2207/30201* (2013.01); *G06T 2210/12* (2013.01)

(56) References Cited

U.S. PATENT DOCUMENTS

2016/0174902 A1* 6/2016 Georgescu ............... G06T 7/73 600/408
2017/0199961 A1* 7/2017 Yelensky ............... G16B 20/00

OTHER PUBLICATIONS

First Office Action, issued in the corresponding Chinese patent application No. 201610605759.1, dated Dec. 5, 2018, 22 pages.
Redmon et al., "You only look once: Unified, Real-Time Object Detection", Computer Vision and Pattern Recognition, 2015, 11 pages; available at: https://arxiv.org/abs/1506.02640.
Third Office Action, issued in the corresponding Chinese patent application No. 201610605759.1, dated Aug. 28, 2019, 33 pages.
Zhou Zhihua, "Machine Learning", Tsinghua University Press Beijing, 2016, 16 pages.
Renchu et al., "Management Information System", China Machine Press, 2001, 15 pages.

* cited by examiner

500 start

↓ construct a neural network including at least one input layer, n intermediate layers and two output layers, n being a positive integer greater than or equal to 2, wherein the m-th intermediate layer is connected to a first branch of the neural network in cascade, the n-th intermediate layer is connected to a second branch of the neural network in cascade, a first output layer of the two output layers is located at the first branch, a second output layer of the two output layers is located at the second branch, and m is less than n ⟶ S501

↓ configure the first output layer of the first branch of the neural network as a confidence output layer outputting a confidence map when object detection is performed using the neural network, the confidence map representing the confidence that each pixel point in a detection image including a detection object, and detected by employing the neural network, belongs to the detection object ⟶ S502

↓ configure the second output layer of the second branch of the neural network as a bounding box output layer outputting a bounding box detection map when the object detection is performed using the neural network, the bounding box detection map including the corresponding vector of each pixel point in the detection image, the corresponding vector representing the position relationship between its corresponding pixel point and the corresponding detection bounding box which is the bounding box of the detection object detected in the detection image by employing the neural network ⟶ S503

↓ end

FIG. 5

METHOD AND APPARATUS FOR NEURAL NETWORK TRAINING AND CONSTRUCTION AND METHOD AND APPARATUS FOR OBJECT DETECTION

CROSS-REFERENCE TO RELATED APPLICATION

This application claims priority to Chinese patent application No. 201610605759.1 filed on Jul. 27, 2016, the entire contents of which are incorporated herein by reference.

TECHNICAL FIELD OF THE DISCLOSURE

Embodiments of the present disclosure relate to the image processing, and in particular to a method and apparatus for training and construction of a neural network and a method and apparatus for neural-network-based objection detection.

BACKGROUND

Object detection is a basic research topic in the field of computer vision and has a wide range of application prospects in many aspects of face recognition, safety monitoring, dynamic tracking and the like. The object detection means that, for any given image, a particular object (such as a face) therein is detected and recognized and the position and size information of the object is returned, for example, a bounding box surrounding the object is output. The objection detection is a complex and challenging pattern detection issue and its main difficulties lie in two aspects. The one aspect is caused due to internal changes such as changes in details, occlusion and the like of the object, and the other aspect is resulted from changes in external conditions such as an imaging angle, illumination influence, the focal length of an imaging device, an imaging distance, different ways to acquire the image, and the like.

Object detection methods based on deep CNNs (convolutional neural networks) are more advanced object detection methods presently. The present CNN-based object detection methods generally include three steps: 1) extracting several candidate regions which may be an object to be detected from an image by utilizing a conventional region proposal method; 2) inputting the extracted candidate regions to the CNN for recognition and categorization; and 3) employing the bounding box regression technique to refine the coarse candidate objects into more accurate object bounds. However, there are still technical problems such as influenced by internal changes of the object, inaccurate object recognition, low detection efficiency and the like in the detection results acquired by the current CNN-based object detection methods.

SUMMARY

The present disclosure is proposed in view of the above problems.

According to one aspect of the present disclosure, there is provided a training method of a neural network for object detection, comprising: inputting a training image including a training object to the neural network to obtain a predicted bounding box of the training object; acquiring a first loss function according to a ratio of the intersection area to the union area of the predicted bounding box and a true bounding box, the true bounding box being a bounding box of the training object marked in advance in the training image; and adjusting parameters of the neural network by utilizing at least the first loss function to train the neural network.

In the training method, said adjusting the parameters of the neural network by utilizing at least the first loss function to train the neural network comprises: adjusting the parameters of the neural network by utilizing at least the first loss function to maximize the ratio of the intersection area to the union area of the predicted bounding box and the true bounding box.

In the training method, said adjusting the parameters of the neural network by utilizing at least the first loss function to train the neural network comprises: determining the values of the parameters when the number of training rounds reaches to a set threshold as values of parameters of the trained neural network.

In the training method, the first loss function is a negative value of a natural logarithm of the ratio of the intersection area to the union area of the predicted bounding box and the true bounding box.

In the training method, said acquiring the first loss function according to the ratio of the intersection area to the union area of the predicted bounding box and the true bounding box comprises: for at least one pixel point located within the true bounding box in the training image, determining a first 4-dimensional vector and a second 4-dimensional vector, wherein elements in the first 4-dimensional vector are distances from the pixel point to the top, bottom, left and right bounds of the true bounding box respectively, and elements in the second 4-dimensional vector represent distances from the pixel point to the top, bottom, left and right bounds of the predicted bounding box corresponding to the pixel point respectively; acquiring the area of the true bounding box according to the first 4-dimensional vector; acquiring the area of the predicted bounding box according to the second 4-dimensional vector; acquiring the intersection area of the predicted bounding box and the true bounding box according to the first 4-dimensional vector and the second 4-dimensional vector; and taking the difference between the sum of the acquired area of the predicted bounding box and the acquired area of the true bounding box and the intersection area as the union area.

The training method further comprises: selecting a second loss function reflecting the difference between a predicted confidence and a true confidence of each pixel point in the training image, the predicted confidence being the confidence, predicted by employing the neural network, that a certain pixel point in the training image belongs to the training object, and the true confidence representing the confidence, marked in advance in the training image, that the certain pixel point belongs to the training object, wherein said adjusting the parameters of the neural network by utilizing at least the first loss function to train the neural network comprises: adjusting the parameters of the neural network by utilizing the first loss function and the second loss function to maximize the ratio of the intersection area to the union area of the predicted bounding box and the true bounding box and to minimize the second loss function so as to obtain the trained neural network.

In the training method, the neural network comprises at least one input layer, n intermediate layers and two output layers, wherein n is a positive integer greater than or equal to 2, and the two output layers comprise a confidence output layer and a bounding box output layer, wherein in a training step, the input layer is configured to receive the training image, the confidence output layer is configured to output a predicted confidence map which represents the confidence, predicted by employing the neural network, that each pixel point in the training image including the training object belongs to the training object, the bounding box output layer is configured to output a bounding box prediction map which contains a 4-dimensional vector of each pixel point located in the training image, wherein, when the pixel point is located within the true bounding box in the training image, elements in the 4-dimensional vector of the pixel point are distances from the pixel point to the top, bottom, left and right bounds of the predicted bounding box corresponding to the pixel point.

The training method further comprises: for each input training image, inputting to the input layer a true confidence map and a training bounding box map whose sizes are same as that of the training image, wherein the training bounding box map contains a 4-dimensional vector of each pixel point located in the training image, wherein, when the pixel point is located within the true bounding box in the training image, elements in the 4-dimensional vector corresponding to the pixel point are distances from the pixel point to the top, bottom, left and right bounds of the true bounding box, and each pixel point in the true confidence map represents the confidence that the corresponding pixel in the training image belongs to the training object.

In the training method, the m-th intermediate layer of the neural network is connected to the confidence output layer in cascade, the n-th intermediate layer is connected to the bounding box output layer in cascade, and m is less than n.

According to another aspect of the present disclosure, there is provided a training apparatus of a neural network for object detection, comprising: a processor; a storage; and a computer program instruction stored on the storage which, when executed by the processor, causes the processor to perform steps of: inputting a training image including a training object to the neural network to obtain a predicted bounding box of the training object; acquiring a first loss function according to a ratio of the intersection area to the union area of the predicted bounding box and a true bounding box, the true bounding box being a bounding box of the training object marked in advance in the training image; and adjusting parameters of the neural network by utilizing at least the first loss function to train the neural network.

In the training apparatus, said adjusting the parameters of the neural network by utilizing at least the first loss function to train the neural network comprises: adjusting the parameters of the neural network by utilizing at least the first loss function to maximize the ratio of the intersection area to the union area of the predicted bounding box and the true bounding box.

In the training apparatus, said adjusting the parameters of the neural network by utilizing at least the first loss function to train the neural network comprises: determining the values of the parameters when the number of training rounds reaches to a set threshold as values of parameters of the trained neural network.

In the training apparatus, the first loss function is a negative value of a natural logarithm of the ratio of the intersection area to the union area of the predicted bounding box and the true bounding box.

In the training apparatus, said acquiring the first loss function according to the ratio of the intersection area to the union area of the predicted bounding box and the true bounding box comprises: for at least one pixel point located within the true bounding box in the training image, determining a first 4-dimensional vector and a second 4-dimensional vector, wherein elements in the first 4-dimensional vector are distances from the pixel point to the top, bottom, left and right bounds of the true bounding box respectively, and elements in the second 4-dimensional vector represent distances from the pixel point to the top, bottom, left and right bounds of the predicted bounding box corresponding to the pixel point respectively; acquiring the area of the true bounding box according to the first 4-dimensional vector; acquiring the area of the predicted bounding box according to the second 4-dimensional vector; acquiring the intersection area of the predicted bounding box and the true bounding box according to the first 4-dimensional vector and the second 4-dimensional vector; and taking the difference between the sum of the acquired area of the predicted bounding box and the acquired area of the true bounding box and the intersection area as the union area.

In the training apparatus, the processor further performs steps of: selecting a second loss function reflecting the difference between a predicted confidence and a true confidence of each pixel point in the training image, the predicted confidence being the confidence, predicted by employing the neural network, that a certain pixel point in the training image belongs to the training object, and the true confidence representing the confidence, marked in advance in the training image, that the certain pixel point belongs to the training object, wherein said adjusting the parameters of the neural network by utilizing at least the first loss function to train the neural network comprises: adjusting the parameters of the neural network by utilizing the first loss function and the second loss function to maximize the ratio of the intersection area to the union area of the predicted bounding box and the true bounding box and to minimize the second loss function so as to obtain the trained neural network.

In the training apparatus, the neural network comprises at least one input layer, n intermediate layers and two output layers, wherein n is a positive integer greater than or equal to 2, and the two output layers comprise a confidence output layer and a bounding box output layer, wherein in a training step, the input layer is configured to receive the training image, the confidence output layer is configured to output a predicted confidence map which represents the confidence, predicted by employing the neural network, that each pixel point in the training image including the training object belongs to the training object, the bounding box output layer is configured to output a bounding box prediction map which contains a 4-dimensional vector of each pixel point located in the training image, wherein, when the pixel point is located within the true bounding box in the training image, elements in the 4-dimensional vector of the pixel point are distances from the pixel point to the top, bottom, left and right bounds of the predicted bounding box corresponding to the pixel point.

In the training apparatus, the processor further performs steps of: for each input training image, inputting to the input layer a true confidence map and a training bounding box map whose sizes are same as that of the training image, wherein the training bounding box map contains a 4-dimensional vector of each pixel point located in the training image, wherein, when the pixel point is located within the true bounding box in the training image, elements in the 4-dimensional vector corresponding to the pixel point are distances from the pixel point to the top, bottom, left and right bounds of the true bounding box, and each pixel point in the true confidence map represents the confidence that the corresponding pixel in the training image belongs to the training object.

In the training apparatus, the m-th intermediate layer of the neural network is connected to the confidence output layer in cascade, the n-th intermediate layer is connected to the bounding box output layer in cascade, and m is less than n.

According to a further aspect of the present disclosure, there is provided a training apparatus of a neural network for object detection, comprising: a prediction means configured to input a training image including a training object to the neural network to obtain a predicted bounding box of the training object; a first acquisition means configured to acquire a first loss function according to a ratio of the intersection area to the union area of the predicted bounding box and a true bounding box, the true bounding box being a bounding box of the training object marked in advance in the training image; and a parameter adjustment means configured to adjust parameters of the neural network by utilizing at least the first loss function to train the neural network.

In the training apparatus, the parameter adjustment means adjusts the parameters of the neural network by utilizing at least the first loss function to maximize the ratio of the intersection area to the union area of the predicted bounding box and the true bounding box.

In the training apparatus, the parameter adjustment means determines the values of the parameters when the number of training rounds reaches to a set threshold as values of parameters of the trained neural network.

In the training apparatus, the first loss function is a negative value of a natural logarithm of the ratio of the intersection area to the union area of the predicted bounding box and the true bounding box.

In the training apparatus, for at least one pixel point located within the true bounding box in the training image, the first acquisition means determines a first 4-dimensional vector and a second 4-dimensional vector, wherein elements in the first 4-dimensional vector are distances from the pixel point to the top, bottom, left and right bounds of the true bounding box respectively, and elements in the second 4-dimensional vector represent distances from the pixel point to the top, bottom, left and right bounds of the predicted bounding box corresponding to the pixel point respectively; acquires the area of the true bounding box according to the first 4-dimensional vector; acquires the area of the predicted bounding box according to the second 4-dimensional vector; acquires the intersection area of the predicted bounding box and the true bounding box according to the first 4-dimensional vector and the second 4-dimensional vector; and takes the difference between the sum of the acquired area of the predicted bounding box and the acquired area of the true bounding box and the intersection area as the union area.

The training apparatus further comprises: a second acquisition means configured to select a second loss function reflecting the difference between a predicted confidence and a true confidence of each pixel point in the training image, the predicted confidence being the confidence, predicted by employing the neural network, that a certain pixel point in the training image belongs to the training object, and the true confidence representing the confidence, marked in advance in the training image, that the certain pixel point belongs to the training object, wherein the parameter adjustment means adjusts the parameters of the neural network by utilizing the first loss function and the second loss function to maximize the ratio of the intersection area to the union area of the predicted bounding box and the true bounding box and to minimize the second loss function so as to obtain the trained neural network.

In the training apparatus, the neural network comprises at least one input layer, n intermediate layers and two output layers, wherein n is a positive integer greater than or equal to 2, and the two output layers comprise a confidence output layer and a bounding box output layer, wherein in a training step, the input layer is configured to receive the training image, the confidence output layer is configured to output a predicted confidence map which represents the confidence, predicted by employing the neural network, that each pixel point in the training image including the training object belongs to the training object, the bounding box output layer is configured to output a bounding box prediction map which contains a 4-dimensional vector of each pixel point located in the training image, wherein, when the pixel point is located within the true bounding box in the training image, elements in the 4-dimensional vector of the pixel point are distances from the pixel point to the top, bottom, left and right bounds of the predicted bounding box corresponding to the pixel point.

In the training apparatus, for each input training image, the prediction means further inputs to the input layer a true confidence map and a training bounding box map whose sizes are same as that of the training image, wherein the training bounding box map contains a 4-dimensional vector of each pixel point located in the training image, wherein, when the pixel point is located within the true bounding box in the training image, elements in the 4-dimensional vector corresponding to the pixel point are distances from the pixel point to the top, bottom, left and right bounds of the true bounding box, and each pixel point in the true confidence map represents the confidence that the corresponding pixel in the training image belongs to the training object.

In the training apparatus, the m-th intermediate layer of the neural network is connected to the confidence output layer in cascade, the n-th intermediate layer is connected to the bounding box output layer in cascade, and m is less than n.

The training method and apparatus of the neural network for objection detection of the embodiment of the present disclosure regress the object bounding box into a whole unit by utilizing the first loss function, significantly increase the objection detection accuracy of the neural network by using the high correlation between respective bounds of the object bounding box, and can be effectively applied to the training and detection of objects of different sizes while improving the efficiency of the neural network.

According to still another aspect of the present disclosure, there is provided a construction method of a neural network for object detection, comprising: constructing the neural network including at least one input layer, n intermediate layers and two output layers, n being a positive integer greater than or equal to 2, wherein the m-th intermediate layer is connected to a first branch of the neural network in cascade, the n-th intermediate layer is connected to a second branch of the neural network in cascade, a first output layer of the two output layers is located at the first branch, a second output layer of the two output layers is located at the second branch, and m is less than n; configuring the first output layer of the first branch of the neural network as a confidence output layer outputting a confidence map when object detection is performed using the neural network, the confidence map representing the confidence that each pixel point in a detection image, including a detection object, and detected by employing the neural network, belongs to the detection object; and configuring the second output layer of the second branch of the neural network as a bounding box output layer outputting a bounding box detection map when the object detection is performed using the neural network, the bounding box detection map including the corresponding vector of each pixel point in the detection image, the corresponding vector representing the position relationship between its corresponding pixel point and the corresponding detection bounding box which is the bounding box of the detection object detected in the detection image by employing the neural network.

In the construction method, when the pixel point is located within the detection bounding box, the corresponding vector of the pixel point is a 4-dimensional vector, and elements in the 4-dimensional vector are distances from the pixel point to the top, bottom, left and right bounds of the detection bounding box.

In the construction method, wherein the first branch of the neural network further comprising: a convolution layer configured to perform convolution on a feature image output from the m-th intermediate layer to obtain a first feature map of the detection image; an up-sample layer configured to perform linear interpolation on the first feature map to resize the first feature map to the size of the detection image; and a crop layer configured to crop the resized first feature map to align the cropped first feature map with the detection image and to output the aligned first feature map to the first output layer of the first branch so as to output the confidence map.

In the construction method, wherein the second branch of the neural network further comprising: a convolution layer configured to perform convolution on a feature image output from the n-th intermediate layer to obtain a second feature map of the detection image; an up-sample layer configured to perform linear interpolation on the second feature map to resize the second feature map to the size of the detection image; a crop layer configured to crop the resized second feature map to align the cropped second feature map with the detection image; and a linear unit correction layer configured to acquire the aligned second feature map and to adjust elements in the corresponding vector of each pixel point in the second feature map into vector elements not less than 0 and then output the same to the second output layer of the second branch so as to output the bounding box detection map.

The construction method further comprises: training the neural network, wherein said training the neural network comprises: inputting a training image including a training object to the neural network to obtain a predicted bounding box of the training object; acquiring a first loss function according to a ratio of the intersection area to the union area of the predicted bounding box and a true bounding box, the predicted bounding box being a bounding box of the training object detected in the training image including the training object by employing the neural network and the true bounding box being a bounding box of the training object marked in advance in the training image; and adjusting parameters of the neural network by utilizing at least the first loss function to train the neural network.

In the construction method, said adjusting the parameters of the neural network by utilizing at least the first loss function to train the neural network comprises: training the neural network by utilizing the first loss function and a second loss function reflecting the difference between a predicted confidence and a true confidence of each pixel point in the training image, the predicted confidence being the confidence, predicted by employing the neural network, that a certain pixel point in the training image belongs to the training object, and the true confidence representing the confidence, marked in advance in the training image, that the pixel point belongs to the training object.

According to another aspect of the present disclosure, there is provided a construction apparatus of a neural network for object detection, comprising: a processor; a storage; and a computer program instruction stored on the storage which, when executed by the processor, causes the processor to perform steps of: constructing the neural network including at least one input layer, n intermediate layers and two output layers, n being a positive integer greater than or equal to 2, wherein the m-th intermediate layer is connected to a first branch of the neural network in cascade, the n-th intermediate layer is connected to a second branch of the neural network in cascade, a first output layer of the two output layers is located at the first branch, a second output layer of the two output layers is located at the second branch, and m is less than n; configuring the first output layer of the first branch of the neural network as a confidence output layer outputting a confidence map when object detection is performed using the neural network, the confidence map representing the confidence that each pixel point in a detection image, including a detection object, and detected by employing the neural network, belongs to the detection object; and configuring the second output layer of the second branch of the neural network as a bounding box output layer outputting a bounding box detection map when the object detection is performed using the neural network, the bounding box detection map including the corresponding vector of each pixel point in the detection image, the corresponding vector representing the position relationship between its corresponding pixel point and the corresponding detection bounding box which is the bounding box of the detection object detected in the detection image by employing the neural network.

In the construction apparatus, when the pixel point is located within the detection bounding box, the corresponding vector of the pixel point is a 4-dimensional vector, and elements in the 4-dimensional vector are distances from the pixel point to the top, bottom, left and right bounds of the detection bounding box.

In the construction apparatus, there are further comprised on the first branch of the neural network: a convolution layer configured to perform convolution on a feature image output from the m-th intermediate layer to obtain a first feature map of the detection image; an up-sample layer configured to perform linear interpolation on the first feature map to resize the first feature map to the size of the detection image; and a crop layer configured to crop the resized first feature map to align the cropped first feature map with the detection image and to output the aligned first feature map to the first output layer of the first branch so as to output the confidence map.

In the construction apparatus, there are further comprised on the second branch of the neural network: a convolution layer configured to perform convolution on a feature image output from the n-th intermediate layer to obtain a second feature map of the detection image; an up-sample layer configured to perform linear interpolation on the second feature map to resize the second feature map to the size of the detection image; a crop layer configured to crop the resized second feature map to align the cropped second feature map with the detection image; and a linear unit correction layer configured to acquire the aligned second feature map and to adjust elements in the corresponding vector of each pixel point in the second feature map into vector elements not less than 0 and then output the same to the second output layer of the second branch so as to output the bounding box detection map.

In the construction apparatus, the processor further performs steps of: training the neural network, wherein said training the neural network comprises: inputting a training image including a training object to the neural network to obtain a predicted bounding box of the training object; acquiring a first loss function according to a ratio of the intersection area to the union area of the predicted bounding box and a true bounding box, the predicted bounding box being a bounding box of the training object detected in the training image including the training object by employing the neural network and the true bounding box being a bounding box of the training object marked in advance in the training image; and adjusting parameters of the neural network by utilizing at least the first loss function to train the neural network.

In the construction apparatus, said adjusting the parameters of the neural network by utilizing at least the first loss function to train the neural network comprises: training the neural network by utilizing the first loss function and a second loss function reflecting the difference between a predicted confidence and a true confidence of each pixel point in the training image, the predicted confidence being the confidence, predicted by employing the neural network, that a certain pixel point in the training image belongs to the training object, and the true confidence representing the confidence, marked in advance in the training image, that the pixel point belongs to the training object.

According to another aspect of the present disclosure, there is provided a construction apparatus of a neural network for object detection, comprising: a construction means configured to construct the neural network including at least one input layer, n intermediate layers and two output layers, n being a positive integer greater than or equal to 2, wherein the m-th intermediate layer is connected to a first branch of the neural network in cascade, the n-th intermediate layer is connected to a second branch of the neural network in cascade, a first output layer of the two output layers is located at the first branch, a second output layer of the two output layers is located at the second branch, and m is less than n; a first configuration means configured to configure the first output layer of the first branch of the neural network as a confidence output layer outputting a confidence map when object detection is performed using the neural network, the confidence map representing the confidence that each pixel point in a detection image, including a detection object, and detected by employing the neural network, belongs to the detection object; and a second configuration means configured to configure the second output layer of the second branch of the neural network as a bounding box output layer outputting a bounding box detection map when the object detection is performed using the neural network, the bounding box detection map including the corresponding vector of each pixel point in the detection image, the corresponding vector representing the position relationship between its corresponding pixel point and the corresponding detection bounding box which is the bounding box of the detection object detected in the detection image by employing the neural network.

In the construction apparatus, when the pixel point is located within the detection bounding box, the corresponding vector of the pixel point is a 4-dimensional vector, and elements in the 4-dimensional vector are distances from the pixel point to the top, bottom, left and right bounds of the detection bounding box.

In the construction apparatus, the construction means further constructs on the first branch of the neural network: a convolution layer configured to perform convolution on a feature image output from the m-th intermediate layer to obtain a first feature map of the detection image; an up-sample layer configured to perform linear interpolation on the first feature map to resize the first feature map to the size of the detection image; and a crop layer configured to crop the resized first feature map to align the cropped first feature map with the detection image and to output the aligned first feature map to the first output layer of the first branch so as to output the confidence map.

In the construction apparatus, the construction means further constructs on the second branch of the neural network: a convolution layer configured to perform convolution on a feature image output from the n-th intermediate layer to obtain a second feature map of the detection image; an up-sample layer configured to perform linear interpolation on the second feature map to resize the second feature map to the size of the detection image; a crop layer configured to crop the resized second feature map to align the cropped second feature map with the detection image; and a linear unit correction layer configured to acquire the aligned second feature map and to adjust elements in the corresponding vector of each pixel point in the second feature map into vector elements not less than 0 and then output the same to the second output layer of the second branch so as to output the bounding box detection map.

The construction apparatus further comprises: a training means configured to train the neural network by the manner of: inputting a training image including a training object to the neural network to obtain a predicted bounding box of the training object; acquiring a first loss function according to a ratio of the intersection area to the union area of the predicted bounding box and a true bounding box, the predicted bounding box being a bounding box of the training object detected in the training image including the training object by employing the neural network and the true bounding box being a bounding box of the training object marked in advance in the training image; and adjusting parameters of the neural network by utilizing at least the first loss function to train the neural network.

In the construction apparatus, the training means trains the neural network by utilizing the first loss function and a second loss function reflecting the difference between a predicted confidence and a true confidence of each pixel point in the training image, the predicted confidence being the confidence, predicted by employing the neural network, that a certain pixel point in the training image belongs to the training object, and the true confidence representing the confidence, marked in advance in the training image, that the pixel point belongs to the training object.

According to another aspect of the present disclosure, there is provided a neural network for objection detection, comprising one input layer, n intermediate layers and two output layers, n being a positive integer greater than or equal to 2, wherein the m-th intermediate layer is connected to a first branch of the neural network in cascade, the n-th intermediate layer is connected to a second branch of the neural network in cascade, a first output layer of the two output layers is located at the first branch, a second output layer of the two output layers is located at the second branch, and m is less than n; the first output layer of the first branch of the neural network is configured to output a confidence map when object detection is performed using the neural network, the confidence map representing the confidence that each pixel point in a detection image, including a detection object, and detected by employing the neural network, belongs to the detection object; and the second output layer of the second branch of the neural network is configured to output a bounding box detection map when the object detection is performed using the neural network, the bounding box detection map including the corresponding vector of each pixel point in the detection image, the corresponding vector representing the position relationship between its corresponding pixel point and the corresponding detection bounding box which is the bounding box of the detection object detected in the detection image by employing the neural network.

In the neural network, when the pixel point is located within the detection bounding box, the corresponding vector of the pixel point is a 4-dimensional vector, and elements in the 4-dimensional vector are distances from the pixel point to the top, bottom, left and right bounds of the detection bounding box.

In the neural network, there are further comprised on the first branch of the neural network: a convolution layer configured to perform convolution on a feature image output from the m-th intermediate layer to obtain a first feature map of the detection image; an up-sample layer configured to perform linear interpolation on the first feature map to resize the first feature map to the size of the detection image; and a crop layer configured to crop the resized first feature map to align the cropped first feature map with the detection image and to output the aligned first feature map to the first output layer of the first branch so as to output the confidence map.

In the neural network, there are further comprised on the second branch of the neural network: a convolution layer configured to perform convolution on a feature image output from the n-th intermediate layer to obtain a second feature map of the detection image; an up-sample layer configured to perform linear interpolation on the second feature map to resize the second feature map to the size of the detection image; a crop layer configured to crop the resized second feature map to align the cropped second feature map with the detection image; and a linear unit correction layer configured to acquire the aligned second feature map and to adjust elements in the corresponding vector of each pixel point in the second feature map into vector elements not less than 0 and then output the same to the second output layer of the second branch so as to output the bounding box detection map.

The neural network is trained by utilizing a first loss function which reflects a ratio of the intersection area to the union area of a predicted bounding box and a true bounding box, the predicted bounding box being a bounding box of a training object predicted in a training image including the training object by employing the neural network and the true bounding box being a bounding box of the training object marked in advance in the training image.

The neural network is trained by utilizing a first loss function which reflects a ratio of the intersection area to the union area of a predicted bounding box and a true bounding box and a second loss function which reflects the difference between a predicted confidence and a true confidence, the predicted bounding box being a bounding box of a training object predicted in a training image including the training object by employing the neural network, the true bounding box being a bounding box of the training object marked in advance in the training image, the predicted confidence being the confidence, predicted by employing the neural network, that a certain pixel point in the training image belongs to the training object, and the true confidence representing the confidence, marked in advance in the training image, that the pixel point belongs to the training object.

The neural network obtained according to the construction method and apparatus of the neural network in the embodiment of the present disclosure can make the branch of the bounding box output layer obtains a larger receptive field than the branch of the confidence output layer upon the regression of the bounding box, so that the branch of the bounding box output layer extracts the bounding box from the confidence map by employing a bottom-up strategy, thereby improving the efficiency of training and detection of the neural network effectively.

According to another aspect of the present disclosure, there is provided an object detection method based on a neural network, comprising: acquiring a detection image including a detection object; performing the object detection in the detection image by utilizing the neural network to output a confidence map and a bounding box detection map, the bounding box detection map including the corresponding vector of each pixel point in the detection image, the corresponding vector representing the position relationship between its corresponding pixel point and the corresponding detection bounding box, each pixel point in the confidence map representing the confidence that each pixel point in the detection image including the detection object belongs to the detection object, the detection bounding box being a bounding box of the detection object detected in the detection image by employing the neural network; obtaining at least one geometry shape by shape fitting based on the confidence of each pixel point in the confidence map; selecting a predetermined number of pixel points within the geometry shape obtained by fitting; for each of selected pixel points, determining the corresponding pixel point in the bounding box detection map and acquiring the detection bounding box corresponding to the corresponding pixel point based on the corresponding vector of the corresponding pixel point; and combining respective detection bounding boxes to obtain one detection bounding box by combination for a same detection object.

In the object detection method, when the pixel point is located within the corresponding detection bounding box, the corresponding vector of the pixel point is a 4-dimensional vector, and elements in the 4-dimensional vector are distances from the pixel point to the top, bottom, left and right bounds of the corresponding detection bounding box.

In the object detection method, said combining respective detection bounding boxes comprises: combining respective detection bounding boxes by utilizing the non-maximal suppression method.

In the object detection method, said obtaining at least one geometry shape by shape fitting based on the confidence of each pixel point in the confidence map comprises: determining a plurality of pixel points whose confidences are greater than a predetermined threshold; and obtaining the at least one geometry shape by fitting based on the plurality of pixel points.

In the object detection method, the neural network comprises at least one input layer, n intermediate layers and two output layers, wherein n is a positive integer greater than or equal to 2, and the two output layers comprise a confidence output layer for outputting the confidence map and a bounding box output layer for outputting the bounding box detection map.

In the object detection method, the m-th intermediate layer of the neural network is connected to the confidence output layer in cascade, the n-th intermediate layer is connected to the bounding box output layer in cascade, and m is less than n.

In the object detection method, the neural network is trained by utilizing a first loss function which reflects a ratio of the intersection area to the union area of a predicted bounding box and a true bounding box, the predicted bounding box being a bounding box of a training object predicted in a training image including the training object by employing the neural network and the true bounding box being a bounding box of the training object marked in advance in the training image.

In the object detection method, the neural network is trained by utilizing a first loss function which reflects a ratio of the intersection area to the union area of a predicted bounding box and a true bounding box and a second loss function which reflects the difference between a predicted confidence and a true confidence, the predicted bounding box being a bounding box of a training object predicted in a training image including the training object by employing the neural network, the true bounding box being a bounding box of the training object marked in advance in the training image, the predicted confidence being the confidence, predicted by employing the neural network, that a certain pixel point in the training image belongs to the training object, and the true confidence representing the confidence, marked in advance in the training image, that the pixel point belongs to the training object.

According to another aspect of the present disclosure, there is provided an object detection apparatus based on a neural network, comprising: a processor; a storage; and a computer program instruction stored on the storage which, when executed by the processor, causes the processor to perform steps of: acquiring a detection image including a detection object; performing the object detection in the detection image by utilizing the neural network to output a confidence map and a bounding box detection map, the bounding box detection map including the corresponding vector of each pixel point in the detection image, the corresponding vector representing the position relationship between its corresponding pixel point and the corresponding detection bounding box, each pixel point in the confidence map representing the confidence that each pixel point in the detection image including the detection object belongs to the detection object, the detection bounding box being a bounding box of the detection object detected in the detection image by employing the neural network; obtaining at least one geometry shape by shape fitting based on the confidence of each pixel point in the confidence map; selecting a predetermined number of pixel points within the geometry shape obtained by fitting; for each of selected pixel points, determining the corresponding pixel point in the bounding box detection map and acquiring the detection bounding box corresponding to the corresponding pixel point based on the corresponding vector of the corresponding pixel point; and combining respective detection bounding boxes to obtain one detection bounding box by combination for a same detection object.

In the object detection apparatus, when the pixel point is located within the corresponding detection bounding box, the corresponding vector of the pixel point is a 4-dimensional vector, and elements in the 4-dimensional vector are distances from the pixel point to the top, bottom, left and right bounds of the corresponding detection bounding box.

In the object detection apparatus, said combining respective detection bounding boxes comprises: combining respective detection bounding boxes by utilizing the non-maximal suppression method.

In the object detection apparatus, said obtaining at least one geometry shape by shape fitting based on the confidence of each pixel point in the confidence map comprises: determining a plurality of pixel points whose confidences are greater than a predetermined threshold; and obtaining the at least one geometry shape by fitting based on the plurality of pixel points.

In the object detection apparatus, the neural network comprises at least one input layer, n intermediate layers and two output layers, wherein n is a positive integer greater than or equal to 2, and the two output layers comprise a confidence output layer for outputting the confidence map and a bounding box output layer for outputting the bounding box detection map.

In the object detection apparatus, the m-th intermediate layer of the neural network is connected to the confidence output layer in cascade, the n-th intermediate layer is connected to the bounding box output layer in cascade, and m is less than n.

In the object detection apparatus, the neural network is trained by utilizing a first loss function which reflects a ratio of the intersection area to the union area of a predicted bounding box and a true bounding box, the predicted bounding box being a bounding box of a training object predicted in a training image including the training object by employing the neural network and the true bounding box being a bounding box of the training object marked in advance in the training image.

In the object detection apparatus, the neural network is trained by utilizing a first loss function which reflects a ratio of the intersection area to the union area of a predicted bounding box and a true bounding box and a second loss function which reflects the difference between a predicted confidence and a true confidence, the predicted bounding box being a bounding box of a training object predicted in a training image including the training object by employing the neural network, the true bounding box being a bounding box of the training object marked in advance in the training image, the predicted confidence being the confidence, predicted by employing the neural network, that a certain pixel point in the training image belongs to the training object, and the true confidence representing the confidence, marked in advance in the training image, that the pixel point belongs to the training object.

According to another aspect of the present disclosure, there is provided an object detection apparatus based on a neural network, comprising: an image acquisition means configured to acquire a detection image including a detection object; a detection means configured to perform the object detection in the detection image by utilizing the neural network to output a confidence map and a bounding box detection map, the bounding box detection map including the corresponding vector of each pixel point in the detection image, the corresponding vector representing the position relationship between its corresponding pixel point and the corresponding detection bounding box, each pixel point in the confidence map representing the confidence that each pixel point in the detection image including the detection object belongs to the detection object, the detection bounding box being a bounding box of the detection object detected in the detection image by employing the neural network; a fitting means configured to obtain at least one geometry shape by shape fitting based on the confidence of each pixel point in the confidence map; a selection means configured to select a predetermined number of pixel points within the geometry shape obtained by fitting; a bounding box acquisition means configured to, for each of selected pixel points, determine the corresponding pixel point in the bounding box detection map and to acquire the detection bounding box corresponding to the corresponding pixel point based on the corresponding vector of the corresponding pixel point; and a combination means configured to combine respective detection bounding boxes to obtain one detection bounding box by combination for a same detection object.

In the object detection apparatus, when the pixel point is located within the corresponding detection bounding box, the corresponding vector of the pixel point is a 4-dimensional vector, and elements in the 4-dimensional vector are distances from the pixel point to the top, bottom, left and right bounds of the corresponding detection bounding box.

In the object detection apparatus, the combination means combines respective detection bounding boxes by utilizing the non-maximal suppression method.

In the object detection apparatus, the fitting means determines a plurality of pixel points whose confidences are greater than a predetermined threshold; and obtains the at least one geometry shape by fitting based on the plurality of pixel points.

In the object detection apparatus, the neural network comprises at least one input layer, n intermediate layers and two output layers, wherein n is a positive integer greater than or equal to 2, and the two output layers comprise a confidence output layer for outputting the confidence map and a bounding box output layer for outputting the bounding box detection map.

In the object detection apparatus, the m-th intermediate layer of the neural network is connected to the confidence output layer in cascade, the n-th intermediate layer is connected to the bounding box output layer in cascade, and m is less than n.

In the object detection apparatus, the neural network is trained by utilizing a first loss function which reflects a ratio of the intersection area to the union area of a predicted bounding box and a true bounding box, the predicted bounding box being a bounding box of a training object predicted in a training image including the training object by employing the neural network and the true bounding box being a bounding box of the training object marked in advance in the training image.

In the object detection apparatus, the neural network is trained by utilizing a first loss function which reflects a ratio of the intersection area to the union area of a predicted bounding box and a true bounding box and a second loss function which reflects the difference between a predicted confidence and a true confidence, the predicted bounding box being a bounding box of a training object predicted in a training image including the training object by employing the neural network, the true bounding box being a bounding box of the training object marked in advance in the training image, the predicted confidence being the confidence, predicted by employing the neural network, that a certain pixel point in the training image belongs to the training object, and the true confidence representing the confidence, marked in advance in the training image, that the pixel point belongs to the training object.

Therefore, the object detection method and apparatus based on the neural network of the embodiment of the present disclosure can obtain accurate and effective object location results, and thus the detection efficiency is high; meanwhile, there is no need to change the size of the input image, and thus the adaptability is stronger and it may be suitable for different sizes of objects, especially for an object of a small size, detection performed on it may also achieve a better effect. In addition, since the corresponding vector of the corresponding detection bounding box may be generated for each pixel point in the embodiment of the present disclosure, corresponding different detection bounding boxes may be obtained for pixel points located within different detection objects. Thus, the embodiment of the present disclosure can process multiple detection objects in the detection image simultaneously.

In the technical scheme according to the embodiment of the present disclosure, the loss function capable of making the neural network converge more quickly and more stably is employed, thereby resulting that the location of the object is more accurate, the detection adaptability of the object detection is stronger and the efficiency is higher. In addition, the neural network structure in the technical scheme of the embodiment of the present disclosure employs the neural network having two branches, and they are connected to the output layer in cascade from different intermediate layers, so that the accuracy of the object detection is further improved.

BRIEF DESCRIPTION OF THE DRAWINGS

The above and other objects, features and advantages of the present disclosure become more apparent through the more detailed description of embodiments of the present disclosure in conjunction with the attached drawings. The attached drawings are used for providing further understanding of the embodiments of the present disclosure, constitute a part of the specification, and are used for explaining the present disclosure together with the embodiments of the present disclosure, but do not limit the present disclosure. In the attached drawings, same reference numbers usually represent same components or steps.

FIG. 5 schematically shows a flow chart of a construction method of a neural network for object detection according to an embodiment of the present disclosure.

DETAILED DESCRIPTION

Figure 1:
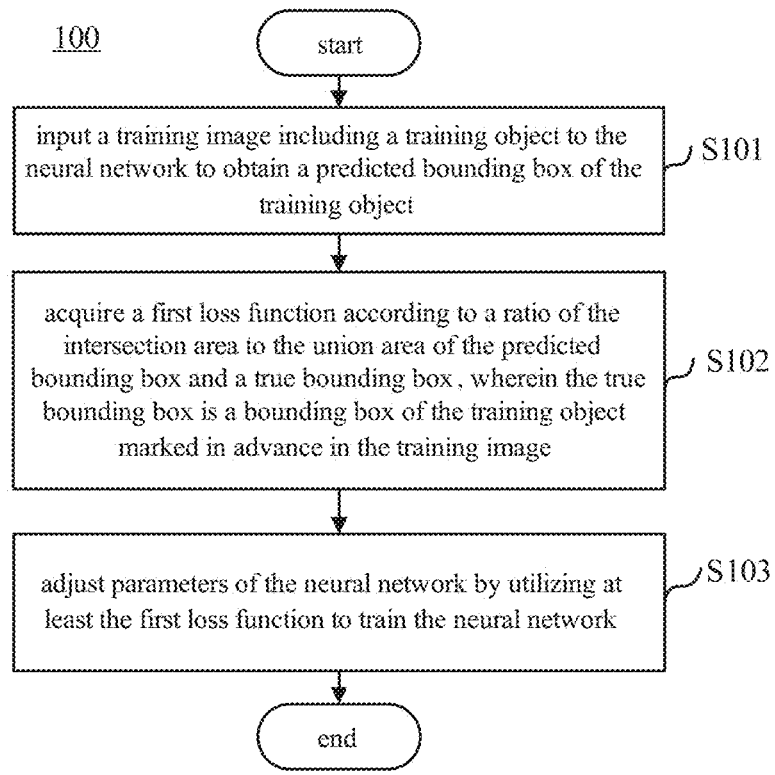
FIG. 1 schematically shows a flow chart of a training method of a neural network for object detection according to an embodiment of the present disclosure.

In order to make the object, technical scheme and advantage of the present disclosure more apparent, example embodiments according to the present disclosure will be described in details with reference to the attached drawings below. Obviously, embodiments to be described are only a part, but not all, of embodiments of the present disclosure. It should be understood that the present disclosure is not limited by example embodiments described herein. All of other embodiments obtained by those skilled in the art based on the embodiments described in the present disclosure without paying any creative work should fall within the protection scope of the present disclosure.

Firstly, basic concepts involved in the present disclosure and basic ideas of training and construction of a neural network for object detection according to embodiments of the present disclosure are introduced simply.

It is well known that performing objection detection utilizing a neural network may be divided into two steps, that is, a training step and a detection step. The so-called training step means that it is required firstly to train the neural network by using a training object to adjust parameters of the neural network. The so-called detection step means that the object detection may be then performed on a detection image including a detection object by utilizing the trained neural network.

$L_2$ loss function is a common objection detection loss function which separately considers distances from a pixel point to the top, bottom, left and right bounds of an object bounding box representing the position and the size of the detected object and thereby adjusts respective parameters of the neural network. The present applicant has recognized that respective bounds in the object bounding box are not multiple separate variables but are relevant as a whole. Thus, for the neural network for object detection, it is possible to regress the obtained bounding box into a whole unit with the aid of the loss function, thereby improving the robustness of the neural network obtained by training and in turn increasing the detection accuracy and efficiency of object detection performed by utilizing the neural network.

In addition, the neural network may be constructed to have two branches, two output layers of which are respectively connected with two different intermediate layers. The intermediate layer connected with a first output layer is before the intermediate layer connected with a second output layer. With such configuration, in the training and detection procedures of the neural network, the output result of the first output layer can be utilized to derive the second output layer and the prediction results of the first output layer and the second output layer are combined to perform the object detection more accurately.

Hereinafter, for the convenience of description, the explanation is made by taking a target object being a face as example. It should be understood that the target object to be detected in the present disclosure is not limited to a face.

In an embodiment of the present disclosure, pixel points located "within" a bounding box may include pixel points located on the bounds of the bounding box.

In the following, a training method of a neural network for object detection according to an embodiment of the present disclosure is described in detail with reference to FIG. 1. FIG. 1 schematically shows a flow chart of a training method of a neural network for object detection according to an embodiment of the present disclosure.

As shown in FIG. 1, the training method 100 includes step S101 of inputting a training image including a training object to the neural network to obtain a predicted bounding box of the training object.

In the training procedure of the neural network, firstly, the training image including at least one training object may be input to the neural network. The neural network may perform feature extraction according to related features of the training object and perform detection by common object detection methods in the art such as SIFT feature extraction, HOG feature extraction and the like, so as to generate the predicted bounding box of the training object. In the training image, the position, size and the like of a true bounding box of the training object may be marked in advance, for example, the training object is marked with a bounding box in advance. For example, taking the training object being a face as an example, it is possible to extract face features by methods such as SIFT feature extraction, HOG feature extraction and the like and then to perform categorization using methods such as SVM categorizer, Adaboost and the like to detect the face, so as to obtain the predicted bounding box of the training face.

For each or some of pixel points in the input training image, one predicted bounding box for the training object may be predicted out by utilizing the neural network. In order to reduce the computation load as much as possible on the basis of acquiring as many as possible prediction results of effective pixel points, optionally, it is possible to predict a corresponding predicted bounding box for each pixel point located within the true bounding box in the training image. The true bounding box is a bounding box of the training object marked in advance in the training image.

In step S102, a first loss function is acquired according to a ratio of the intersection area to the union area of the predicted bounding box and the true bounding box, the true bounding box being a bounding box of the training object marked in advance in the training image.

For each input training image in which the position and size of the true bounding box of the training object are marked in advance, a training bounding box map with the same size as that of the training image may further be input to the neural network, and the neural network outputs a bounding box prediction map. The training bounding box map contains a 4-dimensional vector of each pixel point in the training image, and the 4-dimensional vector indicates the position relationship between its corresponding pixel point and the true bounding box. When the pixel point is located within the true bounding box, elements in the 4-dimensional vector corresponding to the pixel point indicate distances from the pixel point to the top, bottom, left and right bounds of the true bounding box respectively. A pixel point located outside the true bounding box may be represented by a vector of 0. The bounding box prediction map contains a 4-dimensional vector of each pixel point in the training image. When the pixel point is located within the true bounding box in the training image, elements in the 4-dimensional vector of the pixel point are distances from the pixel point to the top, bottom, left and right bounds of the predicted bounding box corresponding to the pixel point respectively. According to the predicted bounding box map of a same training object received by the neural network and the corresponding bounding box map obtained from it, a first 4-dimensional vector and a second 4-dimensional vector of each pixel point located within the true bounding box in the training image may be obtained. Elements in the first 4-dimensional vector are distances from the pixel point to the top, bottom, left and right bounds of the true bounding box respectively. Elements in the second 4-dimensional vector are distances from the pixel point to the top, bottom, left and right bounds of the predicted bounding box corresponding to the pixel point respectively. According to the first 4-dimensional vector and the second 4-dimensional vector, the ratio of the intersection area to the union area of the predicted bounding box and the true bounding box, that is, the value of the area of the intersection portion of the predicted bounding box and the true bounding box divided by the area occupied by the union of the predicted bounding box and the true bounding box, may be computed, and the first loss function is acquired therefrom.

Figure 2:
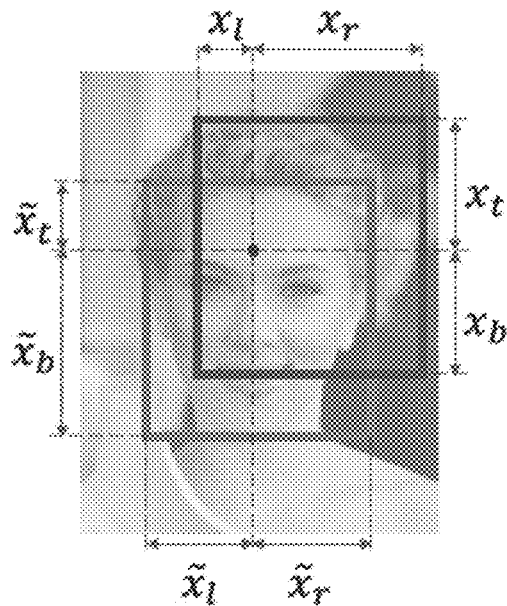
FIG. 2 schematically shows a schematic diagram of a true bounding box and a predicted bounding box in a training method of a neural network for object detection according to an embodiment of the present disclosure.

In one embodiment of the present disclosure, when the bounding box is a square bounding box marking the object, both the true bounding box and the predicted bounding box may be represented based on 4-dimensional vectors of the corresponding pixels. FIG. 2 shows a schematic diagram of a true bounding box and a predicted bounding box in a training method of a neural network for object detection according to an embodiment of the present disclosure. As shown in FIG. 2, for any pixel point located in the true bounding box in the training image, the first 4-dimensional vector and the second 4-dimensional vector may be determined respectively based on the vector of the corresponding pixel point in the training bounding box map and the vector of the corresponding pixel point in the bounding box prediction map. Elements in the first 4-dimensional vector are distances from the pixel point to the top, bottom, left and right bounds of the true bounding box respectively, for example, for the situation as shown in FIG. 2, the true bounding box is located in the bottom-left corner of FIG. 2 and the first 4-dimensional vector may be expressed by $\tilde{x}=(\tilde{x}_t, \tilde{x}_b, \tilde{x}_l, \tilde{x}_r)$; elements in the second 4-dimensional vector represents distances from the pixel point to the top, bottom, left and right bounds of the predicted bounding box corresponding to the pixel point respectively, for example, for the situation as shown in FIG. 2, the predicted bounding box corresponding to the pixel point is located in the top-right corner of FIG. 2 and the second 4-dimensional vector may be expressed by $x=(x_t, x_b, x_l, x_r)$. At this time, after the sign processing to ensure that each of components in respective vectors is not less than 0, the area of the true bounding box as shown in equation (1) can be obtained according to the first 4-dimensional vector:

$$\tilde{X}=(\tilde{x}_t+\tilde{x}_b)\times(\tilde{x}_l+\tilde{x}_r) \qquad (1)$$

The area of the predicted bounding box corresponding to the pixel point as shown in equation (2) is obtained according to the second 4-dimensional vector:

$$X=(x_t+x_b)\times(x_l+x_r) \qquad (2)$$

The intersection area I corresponding to the predicted bounding box and the true bounding box as shown in equation (3) is obtained according to the first 4-dimensional vector and the second 4-dimensional vector:

$$I_h=\min(x_t,\tilde{x}_t)+\min(x_b,\tilde{x}_b),$$

$$I_w=\min(x_l,\tilde{x}_l)+\min(x_r,\tilde{x}_r),$$

$$I=I_h\times I_w \qquad (3)$$

The difference between the sum of the obtained area of the predicted bounding box and the obtained area of the true bounding box and the intersection area may be taken as the union area, and thereby the first loss function is determined. For example, in the embodiment of FIG. 2, the union area may be expressed by equation (4):

$$U=X+\tilde{X}-I \qquad (4)$$

After the above computation, the ratio I/U of the intersection area to the union area can be derived, and thus the first loss function is determined. For example, in one preferred embodiment of the present disclosure, the first loss function may be expressed as a negative value of the natural logarithm of the ratio of the intersection area to the union area of the predicted bounding box and the true bounding box, that is, $L=-\ln(I/U)$. Of course, this is only an example, and the first loss function may also be other suitable functions of the ratio I/U, for example, a logarithm function, a hyperbolic function, etc.

The above expression method for the predicted bounding box and the true bounding box is only one example expression manner when the bounding boxes are square bounding boxes but is not limiting of the present disclosure, and those skilled in the art may also employ other expression manners. For example, when the bounding boxes are square bounding boxes, they may also be expressed with parameters of center point coordinate positions, lengths and widths of the bounding boxes, and the ratio of the intersection area to the union area of the predicted bounding box and the true bounding box may also be computed as the first loss function. Furthermore, the same applies when the bounding boxes are not square bounding boxes. For example, when the bounding boxes are circular bounding boxes, they can be expressed with center coordinates and radiuses, and the ratio of the intersection area to the union area of the predicted bounding box and the true bounding box is computed as the first loss function by utilizing similar methods.

In step S103, parameters of the neural network are adjusted by utilizing at least the first loss function to train the neural network.

In this step, it is possible to utilize the first loss function computed in step S102 to train the neural network, to adjust parameters of the neural network to maximize the ratio of the intersection area to the union area of the predicted bounding box and the true bounding box as much as possible, that is, make I/U as great as possible, and to take values of parameters of the neural network at this time as values of the parameters of the trained neural network. Specifically, in one embodiment, when the loss function correlated with the ratio I/U is expressed as L=−ln(I/U), it is possible to adjust parameters of the neural network to make the first loss function as small as possible and to take values of respective parameters of the neural network when the first loss function converges as values of the parameters of the trained neural network, thereby getting the trained neural network. In another embodiment, it is also possible to set a threshold of the number of training rounds for the neural network and to determine values of respective parameters when the number of training rounds of the neural network reaches the set threshold as values of parameters of the trained neural network.

It should be noted that when the ratio of the intersection area to the union area of the predicted bounding box and the true bounding box is computed for each of multiple pixel points, the parameters of the neural network may be adjust by utilizing the first loss function in the step, so as to maximize the ratio of the intersection area to the union area of the predicted bounding box and the true bounding box corresponding to each pixel point, or to maximize the sum of the ratios of the intersection areas to the union areas of the predicted bounding boxes and the true bounding boxes corresponding to respective pixel points, thereby the respective parameters of the trained neural network are obtained.

It is understood that, after predicting the predicted bounding box and calculating the loss function according to the input training image as described above, it is needed to perform backward conduction feedback according to the computed loss function so as to train the neural network. The backward conduction feedback is a normal process in the neural network training but not the key to the present disclosure. Here, one possible kind of backward conduction feedback is described simply only for the sake of completeness of explanation.

For example, for a case that the bounding boxes in an embodiment of the present disclosure is square bounding boxes and the first loss function is expressed as L=−ln(I/U), the gradient of the backward conduction may be computed as follows:

$$\frac{\partial L}{\partial x} = \frac{I(\nabla_x X - \nabla_x I) - U\nabla_x I}{U^2 \times \frac{I}{U}} = \frac{I(\nabla_x X - \nabla_x I) - U\nabla_x I}{UI} \quad (5)$$

$$= \frac{1}{U}\nabla_x X - \frac{U+1}{UI}\nabla_x I$$

in which, $$\frac{\partial X}{\partial x_t (or \partial x_b)} = x_l + x_r, \quad (6)$$

$$\frac{\partial X}{\partial x_l (or \partial x_r)} = x_t + x_b,$$

$$\frac{\partial I}{\partial x_t (or \partial x_b)} = \begin{cases} I_w, & \text{if } x_t < \tilde{x}_t (\text{or } x_b < \tilde{x}_b) \\ 0, & \text{otherwise} \end{cases},$$

$$\frac{\partial I}{\partial x_l (or \partial x_r)} = \begin{cases} I_w, & \text{if } x_l < \tilde{x}_l (\text{or } x_r < \tilde{x}_r) \\ 0, & \text{otherwise} \end{cases}.$$

In which, $\nabla_x X$ is correlated with the area of the predicted bounding area and is a positive value of the partial derivative of the first loss function, and $\nabla_x I$ is correlated with the intersection portion and is a negative value of the partial derivative of the first loss function. Therefore, it can be seen that, in order to make I/U as large as possible, that is, to make the first loss function L=−ln(I/U) as small as possible, its partial derivative values tend to make the intersection portion (intersection) as large as possible and make the union portion as small as possible. When the area of the intersection portion (intersection) is just equal to the union area, it is an ideal case of the neural network trained by the first loss function in the present embodiment.

Optionally, on the basis of training the neural network by utilizing the first loss function, it is further possible to select a second loss function reflecting the difference between a predicted confidence and a true confidence of each pixel point in the training image to train this neural network together so as to obtain a better training effect. The predicted confidence is the confidence, predicted by employing the neural network, that one pixel point in the training image belongs to the training object, and the true confidence represents the confidence, marked in advance in the training image, that the pixel point belongs to the training object. For each pixel point in the image, the true confidence may be expressed as 1 (or a positive value) and 0 (or a negative value) which are respectively used for indicating that the pixel point belongs to the training object and does not belong to the training object. In the training procedure of the neural network, it is possible to adjust the parameters of the neural network by utilizing the first loss function and the second loss function together to maximize the ratio of the intersection area to the union area of the predicted bounding box and the true bounding box and to minimize the second loss function, so as to obtain the trained neural network. In one embodiment, it is possible to adjust the parameters of the neural network based on a weighted sum of the first loss function and the second loss function to train the neural network. In the procedure of training the neural network by utilizing the second loss function, on one hand, the second loss function may be computed for each or at least one of pixel points in the training image and the difference between the predicted confidence and the true confidence of the pixel point is minimized; on the other hand, the neural network may be trained by utilizing the second loss function to minimize the difference between the predicted confidence and the true confidence for each pixel point for example, or to minimize the sum of the differences between the predicted confidences and the true confidences of respective pixel points, thereby respective parameters of the trained neural network is obtained.

Optionally, the neural network trained in the embodiment may include two output layers. Specifically, the neural network may include at least one input layer, n intermediate layers and two output layers, in which n is a positive integer greater than or equal to 2, and the two output layers include a confidence output layer and a bounding box output layer. In a training step, the input layer is configured to receive the training image, the confidence output layer is configured to output a predicted confidence map which represents the confidence, predicted by employing the neural network, that each pixel point in the training image including the training object belongs to the training object, the bounding box output layer is configured to output a bounding box prediction map which contains a 4-dimensional vector of each pixel point located in the training image. When the pixel point is located within the true bounding box in the training image, elements in the 4-dimensional vector of the pixel point are distances from the pixel point to the top, bottom, left and right bounds of the predicted bounding box corresponding to the pixel point.

In order to obtain the predicted confidence and the bounding box prediction information of the training image, for each input training image, it is possible to further input to the input layer a true confidence map and a training bounding box map whose sizes are same as that of the training image. The training bounding box map contains a 4-dimensional vector of each pixel point in the training image, and when the pixel point is located within the true bounding box in the training image, elements in the 4-dimensional vector corresponding to the pixel point are distances from the pixel point to the top, bottom, left and right bounds of the true bounding box, and each pixel point in the true confidence map represents the confidence that the corresponding pixel in the training image belongs to the training object.

Optionally, the m-th intermediate layer of the neural network is connected to the confidence output layer in cascade, the n-th intermediate layer is connected to the bounding box output layer in cascade, and m is less than n.

In one embodiment, in the procedure of training the above neural network, the first loss function may be computed according to the training bounding box map and the bounding box prediction map output from the bounding box output layer of the neural network; and the second loss function may be computed according to the true confidence map and the predicted confidence map output from the confidence output layer of the neural network. The parameters of the above neural network are adjusted according to the weighted sum of the first loss function and the second loss function to realize training of the neural network.

It should be noted that the situation that the neural network to which the training method according to the embodiment of the present disclosure is applied contains two output layers has been explained in the above, and it should be understood that this is only one example but not limiting of the present disclosure. The training method of a neural network according to the embodiment of the present disclosure has no limitation on the applied neural network and may apply to any suitable neural network, for example, a common neural network with a single output layer and so on.

Therefore, the embodiment of the present disclosure regresses the object bounding box into a whole unit by utilizing the first loss function, the problem that considering by the $L_2$ loss function the four edges of the bounding box as four individual variables results in the prediction accuracy being not high is effectively avoided, and the object detection accuracy of the neural network is efficiently improved. In addition, according to the $L_2$ loss function, in order to balance bounding boxes of different sizes, the input image needs to be adjusted into a certain size, thereby causing the efficiency of training and detection low and failing to adapt to objects of different sizes. However, what is computed in the above method of the embodiment of the present disclosure is the ratio of the intersection area to the union area of the predicted bounding box and the true bounding box and has nothing to do with the specific size of the input image. Thus, the embodiment of the present disclosure can effectively apply to training and detection objects of different sizes while improving the efficiency of the neural network without adjusting the size of the input image.

Figure 3:
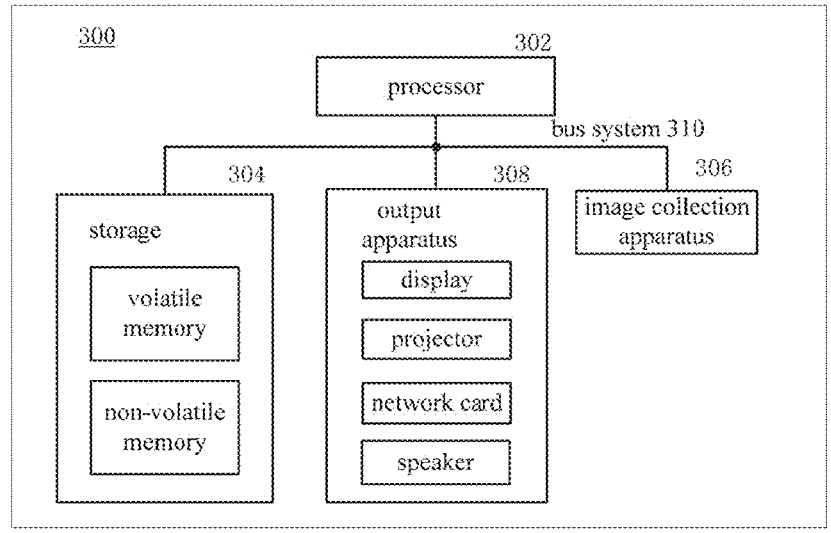
FIG. 3 schematically shows a schematic block diagram of a training apparatus of a neural network for object detection according to an embodiment of the present disclosure.

In the following, a training apparatus of a neural network for object detection according to an embodiment of the present disclosure will be described with reference to FIG. 3. FIG. 3 shows a block diagram of a computing device which may be used to implement the training apparatus of the neural network according to an embodiment of the present disclosure.

As shown in FIG. 3, a computing device 300 includes one or more processors 302, storage 304, an image collection apparatus 306 and an output apparatus 308, and these components are interconnected via a bus system 310 and/or a connection mechanism of other form (not shown). It should be noted that the components and the structure of the computing device 300 shown in FIG. 3 are only exemplary but not limiting, and depending on requirements, the computing device 300 may also have other components and structure.

The processor 302 may be a Center Processing Unit (CPU) or a processing unit of other form having data processing capability and/or instruction execution capability, and may control other components in the computing device 300 to execute desired functions.

The storage 304 may include one or more computer program products which may include computer readable storage media of various forms, for example, volatile memories and/or non-volatile memories. The volatile memories may include for example a Random Access Memory (RAM) and/or a cache, etc. The non-volatile memories may include for example a Read Only Memory (ROM), a hard disk, a flash memory, etc. There may be stored on the computer readable storage media one or more computer program instructions which may be executed by the processor 302 to implement steps of: inputting a training image including a training object to the neural network to obtain a predicted bounding box of the training object; acquiring a first loss function according to a ratio of the intersection area to the union area of the predicted bounding box and a true bounding box, the true bounding box being a bounding box of the training object marked in advance in the training image; and adjusting a parameter of the neural network by utilizing at least the first loss function to train the neural network. There may further be stored in the computer readable storage media various application programs and various data, for example, the input training image, the first loss function, the area of the predicted bounding box, the area of the true bounding box, the corresponding vectors of respective pixel points, predicted confidences and true confidences of respective pixels and so on.

The image collection apparatus 306 may be used for collecting the training image with the training object and storing the photographed training image in the storage 304 for other components to use. Of course, it is also possible to collect the training image by using other image collection devices and to send the collected training image to the computing device 300. In this case, the image collection apparatus 306 may be omitted.

The output apparatus 308 may output various information, for example the image information, the training result, to outside (for example, a user), and may include one or more of a display, a speaker, a projector, a network card, etc.

Figure 4:
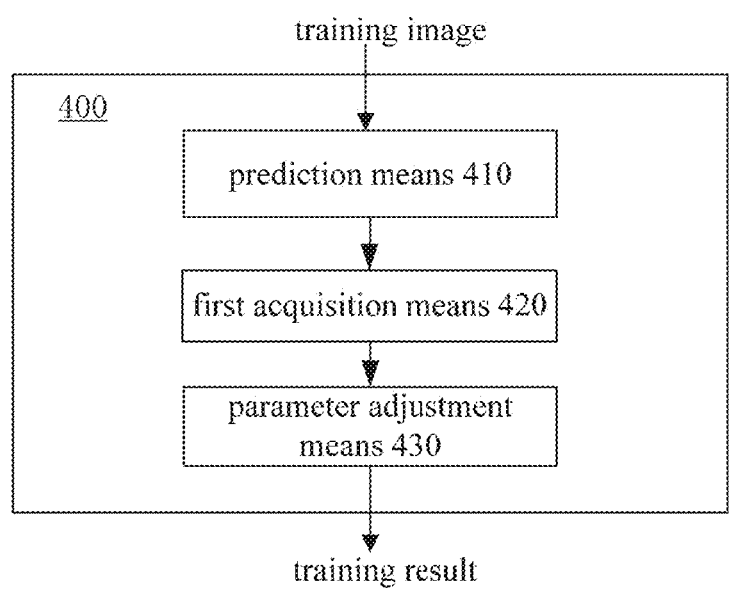
FIG. 4 schematically shows a schematic structural block diagram of a training apparatus of a neural network for object detection according to an embodiment of the present disclosure.

In the following, a training apparatus of a neural network for object detection according to an embodiment of the present disclosure will be described with reference to FIG. 4. FIG. 4 shows an exemplary structural block diagram of a training apparatus 400 of a neural network for object detection according to an embodiment of the present disclosure. As shown in FIG. 4, a training apparatus 400 may include a prediction means 410, a first acquisition means 420 and a parameter adjustment means 430, which may respectively perform respective steps/functions of the training method of the neural network described hereinabove in conjunction with FIGS. 1 and 2. In the following, only main functions of respective units of the training 400 of the neural network will be described and detailed contents which have been described are omitted.

The prediction means 410 is configured to input a training image including a training object to the neural network to acquire a predicted bounding box of the training object. The prediction means 410 may input a training image including at least one training object to the neural network, and the neural network may perform the feature extraction according to related features of the training object to generate a predicted bounding box of the training object.

For each or some of pixel points in the input training image, one predicted bounding box for the training object may be predicted out by utilizing the neural network. In order to reduce the computation load as much as possible on the basis of acquiring as many as possible prediction results of effective pixel points, optionally, it is possible to predict a corresponding predicted bounding box for each pixel point located within the true bounding box. The true bounding box is a bounding box of the training object marked in advance in the training image.

The first acquisition means 420 is configured to acquire a first loss function according to a ratio of the intersection area to the union area of the predicted bounding box and a true bounding box, the true bounding box being a bounding box of the training object marked in advance in the training image.

For each input training image in which the position and size of the true bounding box of the training object are marked in advance, the prediction means 410 may further input a training bounding box map with the same size as that of the training image to the neural network, and the neural network outputs a bounding box prediction map. The training bounding box map contains a 4-dimensional vector of each pixel point in the training image, and the 4-dimensional vector indicates the position relationship between its corresponding pixel point and the true bounding box. When the pixel point is located within the true bounding box, elements in the 4-dimensional vector corresponding to the pixel point indicate distances from the pixel point to the top, bottom, left and right bounds of the true bounding box respectively. A pixel point located outside the true bounding box may be represented by a vector of 0. The bounding box prediction map contains a 4-dimensional vector of each pixel point in the training image. When the pixel point is located within the true bounding box in the training image, elements in the 4-dimensional vector of the pixel point are distances from the pixel point to the top, bottom, left and right bounds of the predicted bounding box corresponding to the pixel point respectively. According to the predicted bounding box map of a same training object received by the neural network and the corresponding bounding box prediction map obtained from it, the first acquisition means 420 may obtain a first 4-dimensional vector and a second 4-dimensional vector of each pixel point located within the true bounding box in the training image. Elements in the first 4-dimensional vector are distances from the pixel point to the top, bottom, left and right bounds of the true bounding box respectively. Elements in the second 4-dimensional vector are distances from the pixel point to the top, bottom, left and right bounds of the predicted bounding box corresponding to the pixel point respectively. According to the first 4-dimensional vector and the second 4-dimensional vector, the ratio of the intersection area to the union area of the predicted bounding box and the true bounding box, that is, the value of the area of the intersection portion of the predicted bounding box and the true bounding box divided by the area occupied by the predicted bounding box and the true bounding box together, may be computed, and the first loss function is acquired therefrom.

As described above, for each of pixel points in the input training image, the prediction means 410 may predict out one predicted bounding box for the training object by utilizing the neural network. In order to reduce the computation load as much as possible on the basis of acquiring as many as possible prediction results of effective pixel points, preferably, the prediction means 410 may predict a corresponding predicted bounding box for each pixel point located within the true bounding box.

In one embodiment of the present disclosure, when the bounding box is a square bounding box marking the object, the first acquisition means 420 may express the true bounding box and the predicted bounding box based on 4-dimensional vectors of the corresponding pixels. Taking FIG. 2 as an example, for any pixel point located in the true bounding box in the training image (the pixel point may include a pixel point located on the bound of the true bounding box), the first 4-dimensional vector and the second 4-dimensional vector may be determined respectively based on the vector of the corresponding pixel point in the training bounding box map and the vector of the corresponding pixel point in the bounding box prediction map. Elements in the first 4-dimensional vector are distances from the pixel point to the top, bottom, left and right bounds of the true bounding box respectively, for example, for the situation as shown in FIG. 2, the true bounding box is located in the bottom-left corner of FIG. 2 and the first 4-dimensional vector may be expressed by $\tilde{x}=(\tilde{x}_t, \tilde{x}_b, \tilde{x}_l, \tilde{x}_r)$; elements in the second 4-dimensional vector represents distances from the pixel point to the top, bottom, left and right bounds of the predicted bounding box corresponding to the pixel point respectively, for example, for the situation as shown in FIG. 2, the predicted bounding box corresponding to the pixel point is located in the top-right corner of FIG. 2 and the second 4-dimensional vector may be expressed by $x=(x_t, x_b, x_l, x_r)$. As described above, the first acquisition means 420 may derive the ratio I/U of the intersection area to the union area, and thus acquire the first loss function. In one preferred embodiment of the present disclosure, the first acquisition means 420 may express the first loss function as $L=-\ln(I/U)$.

The above expression method for the predicted bounding box and the true bounding box by the first acquisition means 420 is only one example expression manner when the bounding boxes are square bounding boxes but is not limiting of the present disclosure, and those skilled in the art may also employ other expression manners. For example, when the bounding boxes are square bounding boxes, they may also be expressed with parameters of center point coordinate positions, lengths and widths of the bounding boxes, and the ratio of the intersection area to the union area of the predicted bounding box and the true bounding box may also be computed as the first loss function. Furthermore, the same applies when the bounding boxes are not square bounding boxes. For example, when the bounding boxes are circular bounding boxes, they can be expressed with center coordinates and radiuses, and the ratio of the intersection area to the union area of the predicted bounding box and the true bounding box is computed as the first loss function by utilizing similar methods.

Finally, the parameter adjustment means 430 adjusts a parameter of the neural network by utilizing at least the first loss function to train the neural network.

When training the neural network by utilizing the first loss function, the parameter adjustment means 430 may adjust parameters of the neural network to maximize the ratio of the intersection area to the union area of the predicted bounding box and the true bounding box as much as possible, that is, make I/U as great as possible, and take values of parameters of the neural network at this time as values of the parameters of the trained neural network. Specifically, in one embodiment, when the first loss function correlated with the ratio I/U is expressed as $L=-\ln(I/U)$, the parameter adjustment means 430 may adjust parameters of the neural network to make the first loss function as small as possible and take values of respective parameters of the neural network when the first loss function converges as values of the parameters of the trained neural network, thereby getting the trained neural network. In another embodiment, the parameter adjustment means 430 may further set a threshold of the number of training rounds for the neural network to determine values of respective parameters when the number of training rounds of the neural network reaches the set threshold as values of parameters of the trained neural network.

In a specific implementation procedure, the training procedure of the neural network includes not only the procedure of predicting the predicted bounding box according to the input training image and calculating the loss function, but also the procedure of performing the backward gradient conduction feedback according to the computed loss function to train the neural network as described previously.

In addition, on the basis of training the neural network by utilizing the first loss function by the parameter adjustment means 430, the training apparatus 400 may further include a second acquisition means (not shown) configured to select a second loss function reflecting the difference between a predicted confidence and a true confidence of each pixel point in the training image to train this neural network together so as to obtain a better training effect. The predicted confidence is the confidence, predicted by employing the neural network, that each pixel point in the training image belongs to the training object, and the true confidence represents the confidence, marked in advance in the training image, that each pixel point belongs to the training object. For each pixel point in the image, the true confidence may be expressed as 1 (or a positive value) and 0 (or a negative value) which are respectively used for indicating that the pixel point falls within the training object and does not fall within the training object. In the procedure of training the neural network, the parameter adjustment means 430 may adjust the parameters of the neural network by utilizing the first loss function and the second loss function together to maximize the ratio of the intersection area to the union area of the predicted bounding box and the true bounding box and to minimize the second loss function, so as to obtain the trained neural network. In one embodiment, it is possible to adjust the parameters of the neural network based on a weighted sum of the first loss function and the second loss function to train the neural network. In the procedure of training the neural network by utilizing the second loss function, on one hand, the second loss function may be computed for each or at least one of pixel points in the training image and the difference between the predicted confidence and the true confidence of the pixel point is minimized; on the other hand, it is possible to minimize the difference between the predicted confidence and the true confidence for each pixel point for example, or to minimize the sum of the differences between the predicted confidences and the true confidences of respective pixel points.

Optionally, the trained neural network for pixel-wise object detection may include two output layers. Specifically, the neural network may include at least one input layer, n intermediate layers and two output layers, in which n is a positive integer greater than or equal to 2, and the two output layers include a confidence output layer and a bounding box output layer. In a training step, the input layer is configured to receive the training image, the confidence output layer is configured to output a predicted confidence map which represents the confidence, predicted by employing the neural network, that each pixel point in the training image including the training object belongs to the training object, the bounding box output layer is configured to output a bounding box prediction map which contains a 4-dimensional vector of each pixel point located in the training image. When the pixel point is located within the true bounding box in the training image, elements in the 4-dimensional vector of the pixel point are distances from the pixel point to the top, bottom, left and right bounds of the predicted bounding box corresponding to the pixel point.

In order to obtain the predicted confidence and the bounding box prediction information of the training image, for each input training image, it is possible for the prediction means 410 to further input to the input layer a true confidence map and a training bounding box map whose sizes are same as that of the training image. The training bounding box map contains a 4-dimensional vector of each pixel point in the training image, and when the pixel point is located within the true bounding box in the training image, elements in the 4-dimensional vector corresponding to the pixel point are distances from the pixel point to the top, bottom, left and right bounds of the true bounding box, and each pixel point in the true confidence map represents the confidence that the corresponding pixel in the training image belongs to the training object. And, in one embodiment of the present disclosure, the m-th intermediate layer of the neural network is connected to the confidence output layer in cascade, the n-th intermediate layer is connected to the bounding box output layer in cascade, and m is less than n.

In one embodiment, in the procedure of training the above neural network, the prediction means 410 may compute the first loss function according to the training bounding box map and the bounding box prediction map output from the bounding box output layer of the neural network; and the second acquisition means (not shown) may compute the second loss function according to the true confidence map and the predicted confidence map output from the confidence output layer of the neural network. The parameter adjustment means 430 adjusts the parameters of the above neural network according to the weighted sum of the first loss function and the second loss function to realize training of the neural network.

It should be noted that the situation that the neural network trained by the training apparatus according to the embodiment of the present disclosure contains two output layers has been explained in the above, and it should be understood that this is only one example but not limiting of the present disclosure. The training apparatus of a neural network according to the embodiment of the present disclosure has no limitation on the applied neural network and may apply to any suitable neural network, for example, a common neural network with a single output layer and so on.

Therefore, the training apparatus of the neural network of the embodiment of the present disclosure regresses the object bounding box into a whole unit by utilizing the first loss function, the problem that considering the four edges of the bounding box as four individual variables results in the prediction accuracy being not high in the prior art is effectively avoided, and the object detection accuracy of the neural network is efficiently improved. In addition, in the prior art methods, in order to balance bounding boxes of different sizes, the input image needs to be adjusted into a certain size, thereby causing the efficiency of training and detection low and failing to adapt to objects of different sizes. However, the above training apparatus of the embodiment of the present disclosure can effectively apply to training and detection objects of different sizes while improving the efficiency of the neural network.

In the following, a construction method of a neural network for object detection according to an embodiment of the present disclosure will be described in detail with reference to FIG. 5. FIG. 5 schematically shows a flow chart of a construction method of a neural network for object detection according to an embodiment of the present disclosure.

As shown in FIG. 5, at step S501, the neural network including at least one input layer, n intermediate layers and two output layers is constructed, in which n is a positive integer greater than or equal to 2. The m-th intermediate layer is connected to a first branch of the neural network in cascade, the n-th intermediate layer is connected to a second branch of the neural network in cascade, a first output layer of the two output layers is located at the first branch, a second output layer of the two output layers is located at the second branch, and m is less than n.

In the present step, the neural network may be set as a pixel-wise object detection neural network including two branches which correspond to two output layers respectively and are connected to different intermediate layers of the neural network in cascade respectively.

At step S502, the first output layer of the first branch of the neural network is configured as a confidence output layer outputting a confidence map when object detection is performed using the neural network, the confidence map representing the confidence that each pixel point in a detection image, including a detection object, and detected by employing the neural network, belongs to the detection object. At step S503, the second output layer of the second branch of the neural network is configured as a bounding box output layer outputting a bounding box detection map when the object detection is performed using the neural network, the bounding box detection map including the corresponding vector of each pixel point in the detection image, the corresponding vector representing the position relationship between its corresponding pixel point and the corresponding detection bounding box which is the bounding box of the detection object detected in the detection image by employing the neural network.

Optionally, when the pixel point is located within the detection bounding box, the corresponding vector of the pixel point is a 4-dimensional vector, and elements in the 4-dimensional vector are distances from the pixel point to the top, bottom, left and right bounds of the detection bounding box.

Optionally, it is possible to construct one or more intermediate layers in the first and the second branches. In one example, there may be further included on the branch connected to the confidence output layer (i.e. the first branch connected to the m-th intermediate layer in cascade): a convolution layer configured to perform convolution on a feature image output from the m-th intermediate layer to acquire a first feature map of the detection image; an up-sample layer configured to perform linear interpolation on the first feature map to resize the first feature map to the size of the detection image; and a crop layer configured to crop the resized first feature map to align the cropped first feature map with the detection image and to output the aligned first feature map to the confidence output layer so as to output the confidence map.

In one embodiment, the m intermediate layers include at least one convolution layer (for example, which may be multiple layers in the neural network model) which is used to receive the training image, to perform feature extraction on the training image, to generate a feature map A representing the confidence that each pixel point in the detection image belongs to the corresponding detection object. The feature map A is input to the convolution layer (for example, a convolution layer with a convolution kernel of 512×3×3×1 and a step length of 1) on the first branch, a further feature extraction is performed to obtain the first feature map A1, and the first feature map A1 is further processed by the up-sample layer and the crop layer on the first branch so as to acquire the desired confidence map in which each pixel point represents the confidence that the corresponding pixel point in the detection map, including the detection object, detected by employing the neural network belongs to the detection object. In another example, there may further be included on the branch of the bounding box output layer (i.e. the second branch connected to the n-th intermediate layer in cascade): a convolution layer configured to perform convolution on a feature image output from the n-th intermediate layer to acquire a second feature map of the detection image; an up-sample layer configured to perform linear interpolation on the second feature map to resize the second feature map to the size of the detection image; a crop layer configured to crop the resized second feature map to align the resized second feature map with the training image; and a rectified linear unit layer configured to acquire the aligned second feature map and to adjust elements in the corresponding vector of each pixel point in the second feature map into vector elements not less than 0 and then output the same to the bounding box output layer so as to output the bounding box detection map.

In one embodiment, the n intermediate layers include intermediate layers (for example, which may be multiple layers in the neural network model), formed by connection of the m intermediated layers with at least one convolution layer C1, which are used to receive the training image, to perform feature extraction on the training image, to generate a feature map B representing that each pixel point in the detection image belongs to the detection bounding box of the corresponding detection object. For example, the n-th intermediate layer as described above may input the acquired feature map A to the convolution layer C1, and the convolution layer C1 performs feature extraction on the feature map to acquire the feature map B. The feature map is input to the convolution layer (for example, a convolution layer with a convolution kernel of 512×3×3×1 and a step length of 1) on the second branch, a further feature extraction is performed to obtain the second feature map B1, and the second feature map B1 is further adjusted by the up-sample layer and the crop layer on the second branch, elements in the corresponding vector of each pixel point in the adjusted second feature map B1 are adjusted into vector elements not less than 0 by the rectified linear unit layer so as to acquire the desired bounding box detection map including the corresponding vector of each pixel point in the detection image, the corresponding vector representing the position relationship between its corresponding pixel point and the corresponding detection bounding box. In one embodiment, through the adjustment by the rectified linear unit layer, the vector of the pixel point located outside the corresponding detection bounding box is adjusted into a vector of 0, and the vector of the pixel point located within the corresponding detection bounding box is adjusted into a vector not less than 0.

Further, the construction method of the neural network of the embodiment of the present disclosure may further include: training the neural network. Here, the neural network may be trained by employing any suitable training method in the art, such as SGD optimization method, RMSProp optimization method, ADAM optimization method and so on, which are not limited by the present disclosure.

As one example, the neural network may be trained by utilizing the first loss function in the previous embodiment of the present disclosure. Specifically, the training step may include: inputting a training image including a training object to the neural network to obtain a predicted bounding box of the training object; acquiring a first loss function according to a ratio of the intersection area to the union area of the predicted bounding box and a true bounding box, the predicted bounding box being a bounding box of the training object predicted in the training image including the training object by employing the neural network and the true bounding box being a bounding box of the training object marked in advance in the training image; and adjusting a parameter of the neural network by utilizing at least the first loss function to train the neural network.

In one embodiment, the first loss function may be computed according to the training bounding box map and the bounding box prediction map. The input layer of the neural network receives the training image and the training bounding box map, and the bounding box output layer on the second branch of the neural network outputs the bounding box prediction map. Thus, the first loss function may be computed through the second branch of the neural network.

In the training procedure, for each pixel point in the input training image, one predicted bounding box for the training object may be predicted out by utilizing the neural network. In order to reduce the computation load as much as possible on the basis of acquiring as many as possible prediction results of effective pixel points, optionally, it is possible to predict a corresponding predicted bounding box for each pixel point located within the true bounding box in the training image.

Optionally, when the bounding box is a square bounding box marking the object, the true bounding box marked in the training image and the predicted bounding box predicted by the neural network may be expressed based on 4-dimensional vectors. For example, as described above with reference to FIG. 2, for any pixel point located in the true bounding box in the training image, the first 4-dimensional vector and the second 4-dimensional vector may be determined respectively based on the vector of the corresponding pixel point in the training bounding box map and the vector of the corresponding pixel point in the bounding box prediction map. Elements in the first 4-dimensional vector are distances from the pixel point to the top, bottom, left and right bounds of the true bounding box respectively, for example, for the situation as shown in FIG. 2, the true bounding box is located in the bottom-left corner of FIG. 2 and the first 4-dimensional vector may be expressed by $\tilde{x}=(\tilde{x}_t, \tilde{x}_b, \tilde{x}_l, \tilde{x}_r)$, elements in the second 4-dimensional vector represents distances from the pixel point to the top, bottom, left and right bounds of the predicted bounding box corresponding to the pixel point respectively, for example, for the situation as shown in FIG. 2, the predicted bounding box corresponding to the pixel point is located in the top-right corner of FIG. 2 and the second 4-dimensional vector may be expressed by $x=(x_t, x_b, x_l, x_r)$. Therefore, the ratio I/U of the intersection area to the union area may be derived, and the first loss function may be acquired. In one example of the present disclosure, the first loss function may be expressed as $L=-\ln(I/U)$.

The above expression method for the predicted bounding box and the true bounding box is only one example expression manner when the bounding boxes are square bounding boxes but is not limiting of the present disclosure, and those skilled in the art may also employ other expression manners. For example, when the bounding boxes are square bounding boxes, they may also be expressed with parameters of center point coordinate positions, lengths and widths of the bounding boxes, and the ratio of the intersection area to the union area of the predicted bounding box and the true bounding box may also be computed as the first loss function. Furthermore, the same applies when the bounding boxes are not square bounding boxes. For example, when the bounding boxes are circular bounding boxes, they can be expressed with center coordinates and radiuses, and the ratio of the intersection area to the union area of the predicted bounding box and the true bounding box is computed as the first loss function by utilizing similar methods.

When training the neural network by utilizing the first loss function, it is possible to adjust parameters of the neural network to maximize the ratio of the intersection area to the union area of the predicted bounding box and the true bounding box as much as possible, that is, make I/U as great as possible, and to take values of parameters of the neural network at this time as values of the parameters of the trained neural network. In other words, in one embodiment, when the first loss function correlated with the ratio I/U is expressed as $L=-\ln(I/U)$, it is needed to adjust parameters of the neural network to make the first loss function converge as far as possible so as to get the trained neural network. In another embodiment, a threshold of the number of training rounds may be set for the neural network to determine values of parameters when the number of training rounds of the neural network reaches the set threshold as values of parameters of the trained neural network.

In addition, on the basis of training the neural network by utilizing the first loss function, it is further possible to utilize a second loss function reflecting the difference between a predicted confidence and a true confidence to train this neural network so as to obtain a better training effect. The predicted confidence is the confidence, predicted by employing the neural network, that each pixel point in the training image belongs to the training object, and the true confidence represents the confidence, marked in advance in the training image, that each pixel point belongs to the training object. For each pixel point in the image, the true confidence may be expressed as 1 (or a positive value) and 0 (or a negative value) which are respectively used for indicating that the pixel point falls within the training object and does not fall within the training object. In the procedure of training the neural network, it is possible to adjust the parameters of the neural network by utilizing the first loss function and the second loss function together to maximize the ratio of the intersection area to the union area of the predicted bounding box and the true bounding box and to minimize the second loss function, so as to obtain the trained neural network. In one embodiment, the final loss function of the neural network depends on the weighted sum of two branch loss functions.

In one embodiment, it is possible to compute the second loss function according to the true confidence map and the predicted confidence map output from the confidence output layer of the neural network. The input layer of the neural network may accept the training image and the true confidence map, and the confidence output layer on the first branch may output the predicted confidence map, and thus the second loss function may be computed according to the first branch of the neural network.

In the procedure of performing object detection by utilizing the constructed neural network, at least one pixel point in the confidence map output from the first output layer is utilized to select the corresponding pixel point in the bounding box detection map output from the second output layer, and the relationship between the pixel point and the top, bottom, left and right bounds of the detection bounding box may be obtained according to the vector of the selected corresponding pixel point in the bounding box detection map, so that a more accurate bounding box may be obtained. Thus, by creating the neural network in such a setting that there are two branches and two output layers thereof are connected with two different intermediate layers respectively, prediction results of the first output layer and the second output layer may be combined, so that the object detection is performed more accurately.

Figure 6:
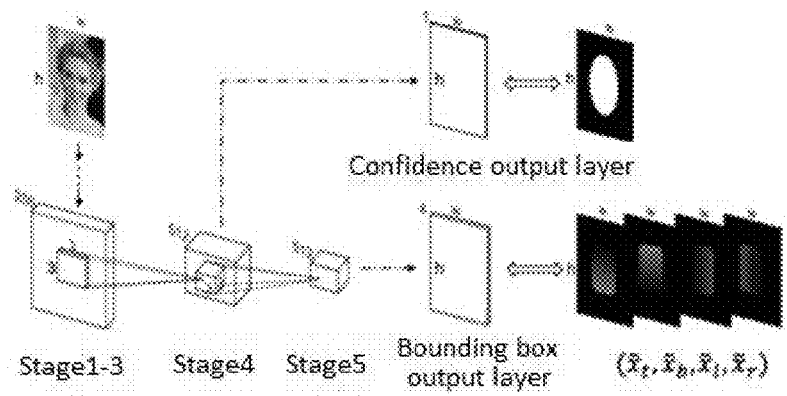
FIG. 6 schematically shows a schematic structure diagram of a neural network for object detection according to an embodiment of the present disclosure.

For example, FIG. 6 illustrates a schematic structure diagram of a neural network obtained by the construction method of the neural network according to an embodiment of the present disclosure and a schematic flow chart for training this neural network. As shown in FIG. 6, the neural network includes two branches in which the confidence output layer is located in the first branch and used for outputting the confidence map and the bounding box output layer is located in the second branch and used for outputting the bounding box detection map.

Considering that the bounding box output layer needs a larger receptive field than the confidence output layer when the bounding box is regressed into a whole, optionally, in the neural network according to the embodiment of the present disclosure shown in FIG. 6, the confidence output layer is connected to the end of VGG stage-4 in cascade while the bounding box output layer is connected to the end of VGG stage-5 in cascade, that is, the intermediate layer connected with the confidence output layer in cascade is closer to the front than the intermediate layer connected with the bounding box output layer in cascade.

Taking face detection as an example, in the procedure of training the neural network as shown in FIG. 6, firstly, an image including a face is input as a training image, and subsequently, after the intermediate layers of stage1-4, a feature map representing a predicted confidence is output to a confidence output layer of the first branch via the first branch so as to output the predicted confidence map. After the intermediate layer of stage-5 further, a feature map representing the position relationships between each pixel point and the predicted bounding box corresponding to the pixel point is output to the bounding box output layer of the second branch via the second branch so as to output the bounding prediction map which contains the corresponding vector of each pixel point in the training image. Predicted confidence map indicates, with a gradually varied gray-scale map, the magnitudes (in a range of 0-1) of the confidence corresponding to different pixel points which correspond to probabilities of pixel points falling within the training object. Likewise, the bounding box prediction map indicates, with four gradually varied gray-scale maps, the position relationships between pixel points in the training image and the corresponding predicted bounding boxes respectively. When a pixel point is located within the corresponding predicted bounding box, elements in the vector of the pixel point represent the magnitudes of distances from the pixel point to four bounds, i.e. the top, bottom, left and right bounds, of the predicted bounding box corresponding to the pixel point. The loss function in the neural network of FIG. 6 may be determined by comparison between the predicted value of the training image and input true value of the training image by the neural network. As shown by two corresponding double arrows after the confidence output layer and the bounding box output layer respectively, the neural network acquires the first loss function by comparison between four vector maps, representing distances to the bounding box, output from the bounding box output layer and the true bounding box vector map (that is, training bounding box map) input from the input layer after the double arrows; and acquires the second loss function by comparison between the predicted confidence gray-scale map output from the confidence output layer and the true confidence map input from the input layer after the double arrows. The true bounding box vector map (that is, training bounding box map) is four gradually varied gray-scale maps for distances to the four bounds of the true bounding box from the pixel point, and the true confidence map indicates cases that the pixel point falls within the training object (1) and that the pixel point does not fall within the training object (0) with white and black respectively. The final loss function of the neural network depends on the weighted sum of two branch loss functions. Since the intermediate layer connected with the confidence output layer in cascade is closer to the front than the intermediate layer connected with the bounding box output layer in cascade in the training procedure, intuitively, the bounding box may be predicted from the confidence map.

Therefore, the construction method of the neural network in the embodiment of the present disclosure can make the branch of the bounding box output layer obtains a larger receptive field than the branch of the confidence output layer upon the regression of the bounding box, so that the branch of the bounding box output layer extracts the bounding box from the confidence map by employing a bottom-up strategy, thereby improving the efficiency of training and detection of the neural network effectively.

Figure 7:
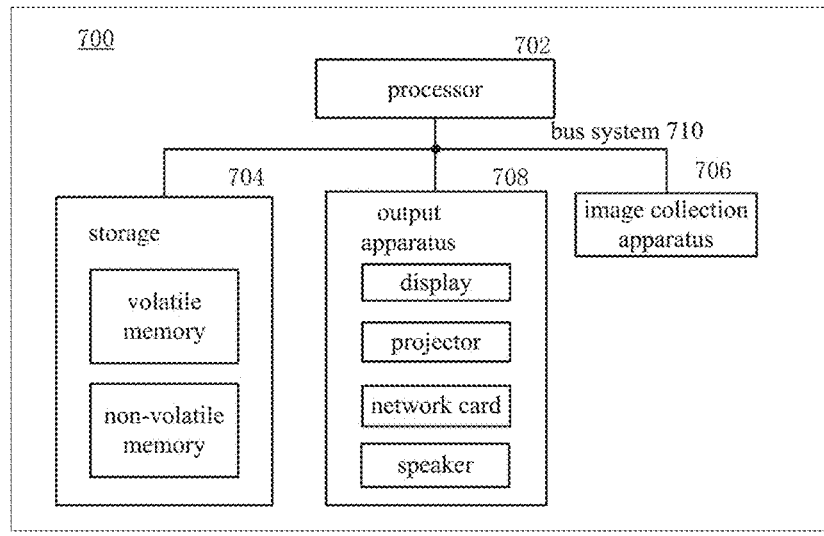
FIG. 7 schematically shows a schematic block diagram of a construction apparatus of a neural network for object detection according to an embodiment of the present disclosure.

In the following, a construction apparatus of a neural network for object detection according to an embodiment of the present disclosure will be described with reference to FIG. 7. FIG. 7 shows a block diagram of a computing device which may be used to implement the construction apparatus of the neural network according to an embodiment of the present disclosure.

As shown in FIG. 7, a computing device 700 includes one or more processors 702, storage 704, an image collection apparatus 706 and an output apparatus 708, and these components are interconnected via a bus system 710 and/or a connection mechanism of other form (not shown). It should be noted that the components and the structure of the computing device 700 shown in FIG. 7 are only exemplary but not limiting, and depending on requirements, the computing device 700 may also have other components and structure.

The processor 702 may be a Center Processing Unit (CPU) or a processing unit of other form having data processing capability and/or instruction execution capability, and may control other components in the computing device 700 to execute desired functions.

The storage 704 may include one or more computer program products which may include computer readable storage media of various forms, for example, volatile memories and/or non-volatile memories. The volatile memories may include for example a Random Access Memory (RAM) and/or a cache, etc. The non-volatile memories may include for example a Read Only Memory (ROM), a hard disk, a flash memory, etc. There may be stored on the computer readable storage media one or more computer program instructions which may be executed by the processor 702 to implement steps of: constructing the neural network including at least one input layer, n intermediate layers and two output layers, n being a positive integer greater than or equal to 2, wherein the m-th intermediate layer is connected to a first branch of the neural network in cascade, the n-th intermediate layer is connected to a second branch of the neural network in cascade, and m is less than n; configuring the first output layer of the first branch of the neural network as a confidence output layer outputting a confidence map when object detection is performed using the neural network, the confidence map representing the confidence that each pixel point in a detection image, including a detection object, and detected by employing the neural network, belongs to the detection object; and configuring the second output layer of the second branch of the neural network as a bounding box output layer outputting a bounding box detection map when the object detection is performed using the neural network, the bounding box detection map including the corresponding vector of each pixel point in the detection image, the corresponding vector representing the position relationship between its corresponding pixel point and the corresponding detection bounding box which is the bounding box of the detection object detected in the detection image by employing the neural network.

The image collection apparatus 706 may be used for collecting the training image with the training object and storing the photographed training image in the storage 704 for other components to use when the processor 702 trains the neural network. Of course, it is also possible to photograph and collect the training image by using other image collection devices and to send the photographed training image to the computing device 700. In this case, the image collection means 706 may be omitted.

The output apparatus 708 may output various information, for example the image information, the training result, to outside (for example, a user), and may include one or more of a display, a speaker, a projector, a network card, etc.

Figure 8:
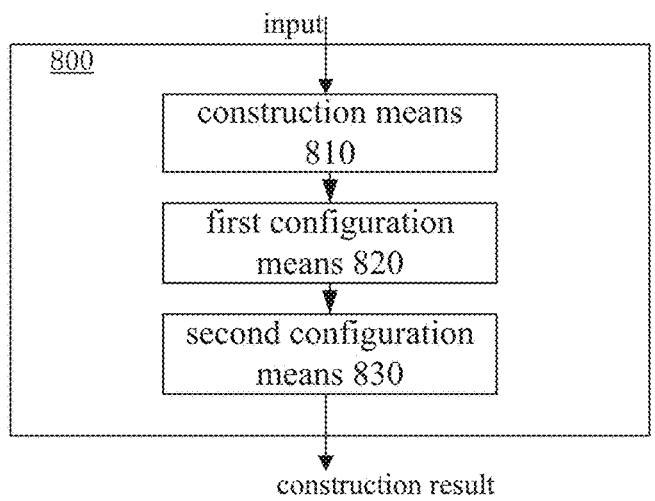
FIG. 8 schematically shows a schematic structural block diagram of a construction apparatus of a neural network for object detection according to an embodiment of the present disclosure.

In the following, a construction apparatus of a neural network for object detection according to an embodiment of the present disclosure will be described with reference to FIG. 8. FIG. 8 shows a schematic structural block diagram of a construction apparatus of a neural network for object detection according to an embodiment of the present disclosure.

As shown in FIG. 8, the construction apparatus 800 includes: a construction means 810 configured to construct the neural network including at least one input layer, n intermediate layers and two output layers, n being a positive integer greater than or equal to 2, wherein the m-th intermediate layer is connected to a first branch of the neural network in cascade, the n-th intermediate layer is connected to a second branch of the neural network in cascade, and m is less than n; a first configuration means 820 configured to configure the first output layer of the first branch of the neural network as a confidence output layer outputting a confidence map when object detection is performed using the neural network, the confidence map representing the confidence that each pixel point in a detection image, including a detection object, and detected by employing the neural network, belongs to the detection object; and a second configuration means 830 configured to configure the second output layer of the second branch of the neural network as a bounding box output layer outputting a bounding box detection map when the object detection is performed using the neural network, the bounding box detection map including the corresponding vector of each pixel point in the detection image, the corresponding vector representing the position relationship between its corresponding pixel point and the corresponding detection bounding box which is the bounding box of the detection object detected in the detection image by employing the neural network.

The construction means 810 may setting the neural network as a pixel-wise object detection neural network including two branches which correspond to two output layers respectively and are connected to different intermediate layers of the neural network in cascade respectively.

As shown in FIG. 6, in the branch connecting with the confidence output layer in the neural network of FIG. 6, the construction means 810 may also configure the neural network with multiple layer structures such as a convolution layer configured to perform convolution on a feature image (for example, the feature image output after the stage1-3 and stage4 of the detection image) output from the m-th intermediate layer to acquire a first feature map of the detection image, an up-sample layer configured to perform linear interpolation on the first feature map to resize the first feature map to the size of the detection image and a crop layer configured to crop the resized first feature map to align the cropped first feature map with the detection image and to output the aligned first feature map to the confidence output layer so as to output the confidence map.

In the branch connecting with the bounding box output layer in the neural network of FIG. 6, the construction means 810 may also configure the neural network to include a convolution layer configured to perform convolution on a feature image (for example, the feature image output after the stage1-3, stage4 and stage5 of the detection image) output from the n-th intermediate layer to acquire a second feature map of the detection image, an up-sample layer configured to perform linear interpolation on the second feature map to resize the second feature map to the size of the detection image, a crop layer configured to crop the resized second feature map to align the cropped second feature map with the detection image and a rectified linear unit layer configured to acquire the aligned second feature map and to adjust elements in the corresponding vector of each pixel point in the second feature map into vector elements not less than 0 and then output the same to the bounding box output layer so as to output the bounding box detection map. The rectified linear unit layer can correct all symbols of the 4-dimensional vectors output from the bounding box output layer to be vectors not less than 0 so as to be adapted to the related computation of the first loss function subsequently. After the adjustment by the rectified linear unit layer, the vector of the pixel point located outside the corresponding detection bounding box is adjusted into a vector of 0, and the corresponding vector of the pixel point located within the corresponding detection bounding box is a vector not less than 0. As compared with the prior art, the neural network constructed in the embodiment of the present disclosure employs as little as possible neural network layer structures so as to further improve the detection efficiency of the neural network.

When the pixel point is located within the bounding box of the detection object, the corresponding vector is a 4-dimensional vector, and elements in the 4-dimensional vector are distances from the corresponding pixel point to the top, bottom, left and right bounds of the corresponding detection bounding box.

Further, the construction apparatus 800 according to the embodiment of the present disclosure may further include a training means (not shown) configured to train the neural network. The training steps thereof include: inputting a training image including a training object to the neural network to obtain a predicted bounding box of the training object; acquiring a first loss function according to a ratio of the intersection area to the union area of the predicted bounding box and a true bounding box, the predicted bounding box being a bounding box of the training object predicted in the training image including the training object by employing the neural network and the true bounding box being a bounding box of the training object marked in advance in the training image; and adjusting a parameter of the neural network by utilizing at least the first loss function to train the neural network.

In one embodiment, the input layer of the constructed neural network may receive the training image and the training bounding box map, and the bounding box output layer on the second branch of the neural network outputs the bounding box prediction map. The training bounding box map contains a 4-dimensional vector of each pixel point in the training image, and the 4-dimensional vector indicates the position relationship between its corresponding pixel point and the true bounding box. When the pixel point is located within the true bounding box, elements in the 4-dimensional vector corresponding to the pixel point indicate distances from the pixel point to the top, bottom, left and right bounds of the true bounding box respectively. A pixel point located outside the true bounding box may be represented by a vector of 0. The bounding box prediction map contains a 4-dimensional vector of each pixel point in the training image. When the pixel point is located within the true bounding box in the training image, elements in the 4-dimensional vector of the pixel point are distances from the pixel point to the top, bottom, left and right bounds of the predicted bounding box corresponding to the pixel point respectively.

In the training procedure, for each pixel point in the input training image, one predicted bounding box for the training object may be predicted out by utilizing the neural network. In order to reduce the computation load as much as possible on the basis of acquiring as many as possible prediction results of effective pixel points, preferably, it is possible to predict a corresponding predicted bounding box for each pixel point located within the true bounding box.

In one embodiment of the present disclosure, when the bounding box is a square bounding box marking the object, both the true bounding box and the predicted bounding box may be expressed by 4-dimensional vectors. Taking FIG. 2 as an example, for any pixel point located in the true bounding box in the training image (the pixel point may include a pixel point located on a bound of the true bounding box), the training means may determine the first 4-dimensional vector and the second 4-dimensional vector of the pixel point respectively based on the vector of the corresponding pixel point in the training bounding box map and the vector of the corresponding pixel point in the bounding box prediction map. Elements in the first 4-dimensional vector are distances from the pixel point to the top, bottom, left and right bounds of the true bounding box respectively, for example, for the situation as shown in FIG. 2, the true bounding box is located in the bottom-left corner of FIG. 2 and the first 4-dimensional vector may be expressed by $\tilde{x}=(\tilde{x}_t,\tilde{x}_b,\tilde{x}_l,\tilde{x}_r)$; elements in the second 4-dimensional vector represents distances from the pixel point to the top, bottom, left and right bounds of the predicted bounding box corresponding to the pixel point respectively, for example, for the situation as shown in FIG. 2, the predicted bounding box corresponding to the pixel point is located in the top-right corner of FIG. 2 and the second 4-dimensional vector may be expressed by $x=(x_t,x_b,x_l,x_r)$. As described above, the ratio I/U of the intersection area to the union area may be derived likewise, and the first loss function may be acquired. In one preferred embodiment of the present disclosure, the first loss function may be expressed as $L=-\ln(I/U)$.

The above expression method for the predicted bounding box and the true bounding box is only one example expression manner when the bounding boxes are square bounding boxes but is not limiting of the present disclosure, and those skilled in the art may also employ other expression manners. For example, when the bounding boxes are square bounding boxes, they may also be expressed with parameters of center point coordinate positions, lengths and widths of the bounding boxes, and the ratio of the intersection area to the union area of the predicted bounding box and the true bounding box may also be computed as the first loss function. Furthermore, the same applies when the bounding boxes are not square bounding boxes. For example, when the bounding boxes are circular bounding boxes, they can be expressed with center coordinates and radiuses, and the ratio of the intersection area to the union area of the predicted bounding box and the true bounding box is computed as the first loss function by utilizing similar methods.

When the training means trains the neural network by utilizing the first loss function, it is possible to adjust parameters of the neural network to maximize the ratio of the intersection area to the union area of the predicted bounding box and the true bounding box as much as possible, that is, make I/U as great as possible, and to take values of parameters of the neural network at this time as values of the parameters of the trained neural network. In other words, in one embodiment, when the first loss function correlated with the ratio I/U is expressed as $L=-\ln(I/U)$, it is needed to adjust parameters of the neural network to make the first loss function converge as far as possible so as to get the trained neural network. In another embodiment, a threshold of the number of training rounds may be set for the neural network to determine values of parameters when the number of training rounds of the neural network reaches the set threshold as values of parameters of the trained neural network.

In addition, on the basis of training the neural network by utilizing the first loss function, the training means may further utilize a second loss function reflecting the difference between a predicted confidence and a true confidence of each pixel point in the training image to train this neural network so as to obtain a better training effect. The predicted confidence is the confidence, predicted by employing the neural network, that each pixel point in the training image belongs to the training object, and the true confidence represents the confidence, marked in advance in the training image, that each pixel point belongs to the training object. For each pixel point in the image, the true confidence may be expressed as 1 (or a positive value) and 0 (or a negative value) which are respectively used for indicating that the pixel point falls within the training object and does not fall within the training object. In the procedure of training the neural network, it is possible to adjust the parameters of the neural network by utilizing the first loss function and the second loss function together to maximize the ratio of the intersection area to the union area of the predicted bounding box and the true bounding box and to minimize the second loss function, so as to obtain the trained neural network. The final loss function of the neural network depends on the weighted sum of two branch loss functions.

In one embodiment, the input layer of the constructed neural network is configured to receive the training image and the true confidence map, and the confidence output layer on the first branch may output the predicted confidence map which represents the confidence, predicted by employing the neural network, that each pixel point in the training image including the training object belongs to the training object, and thus the second loss function may be computed by utilizing the first branch of the constructed neural network.

In the procedure of performing object detection by utilizing the neural network constructed by the construction apparatus, at least one pixel point in the confidence map output from the first output layer is utilized to select the corresponding pixel point in the bounding box detection map output from the second output layer, and the relationship between the pixel point and the top, bottom, left and right bounds of the detection bounding box may be obtained according to the vector of the selected corresponding pixel point in the bounding box detection map, so that a more accurate bounding box may be obtained. Thus, by creating the neural network in such a setting that there are two branches and two output layers thereof are connected with two different intermediate layers respectively, prediction results of the first output layer and the second output layer may be combined, so that the object detection is performed more accurately.

Therefore, the construction apparatus of the neural network in the embodiment of the present disclosure can make the branch of the bounding box output layer obtains a larger receptive field than the branch of the confidence output layer upon the regression of the bounding box, so that the branch of the bounding box output layer extracts the bounding box from the confidence map by employing a bottom-up strategy, thereby improving the efficiency of training and detection of the neural network effectively.

An embodiment of the present disclosure further provides a neural network for object detection. FIG. 6 shows one preferred structure of a neural network for object detection according to an embodiment of the present disclosure.

The neural network includes one input layer, n intermediate layers and two output layers, in which n is a positive integer greater than or equal to 2, the m-th intermediate layer is connected to the first branch of the neural network in cascade, the n-th intermediate layer is connected to the second branch of the neural network in cascade, and m is less than n. The first output layer of the first branch of the neural network is configured to output the confidence map when the object detection is performed by utilizing the neural network, and the confidence map represents the confidence that each pixel point in a detection image, including a detection object, detected by employing the neural network belongs to the detection object. The second output layer of the second branch of the neural network is configured as a bounding box output layer outputting a bounding box detection map when the object detection is performed using the neural network, the bounding box detection map including the corresponding vector of each pixel point in the detection image, the corresponding vector representing the position relationship between its corresponding pixel point and the corresponding detection bounding box which is the bounding box of the object detected in the detection image by employing the neural network.

In the branch connecting with the confidence output layer in the neural network of FIG. 6, there may be included multiple layer structures such as a convolution layer configured to perform convolution on a feature image (for example, the feature image output after the stage1-3 and stage4 of the detection image) output from the m-th intermediate layer to acquire a first feature map of the detection image, an up-sample layer configured to perform linear interpolation on the first feature map to resize the first feature map to the size of the detection image and a crop layer configured to crop the resized first feature map to align the cropped first feature map with the detection image and to output the aligned first feature map to the confidence output layer so as to output the confidence map.

In the branch connecting with the bounding box output layer in the neural network of FIG. 6, there may further be included: a convolution layer configured to perform convolution on a feature image (for example, the feature image output after the stage1-3, stage4 and stage5 of the detection image) output from the n-th intermediate layer to acquire a second feature map of the detection image, an up-sample layer configured to perform linear interpolation on the second feature map to resize the second feature map to the size of the detection image, a crop layer configured to crop the resized second feature map to align the cropped second feature map with the detection image and a rectified linear unit layer configured to acquire the aligned second feature map and to adjust elements in the corresponding vector of each pixel point in the second feature map into vector elements not less than 0 and then output the same to the bounding box output layer so as to output the bounding box detection map. The rectified linear unit layer can correct all symbols of the 4-dimensional vectors output from the bounding box output layer to be vectors not less than 0 so as to be adapted to the related computation of the first loss function subsequently. After the adjustment by the rectified linear unit layer, the vector of the pixel point located outside the corresponding detection bounding box is adjusted into a vector of 0, and the corresponding vector of the pixel point located within the corresponding detection bounding box is a vector not less than 0. As compared with the prior art, the neural network constructed in the embodiment of the present disclosure employs as little as possible neural network layer structures so as to further improve the detection efficiency of the neural network.

When the pixel point is located within the bounding box of the detection object, the corresponding vector is a 4-dimensional vector, and elements in the 4-dimensional vector are distances from the corresponding pixel point to the top, bottom, left and right bounds of the corresponding detection bounding box.

Further, the neural network of the embodiment of the present disclosure is trained by using a first loss function which reflects a ratio of the intersection area to the union area of a predicted bounding box and a true bounding box. The predicted bounding box is a bounding box of the training object predicted in the training image including the training object by employing the neural network and the true bounding box is a bounding box of the training object marked in advance in the training image.

In one embodiment, the input layer of the neural network may receive the training image and the training bounding box map, and the bounding box output layer on the second branch of the neural network outputs the bounding box prediction map. The training bounding box map contains a 4-dimensional vector of each pixel point in the training image, and the 4-dimensional vector indicates the position relationship between its corresponding pixel point and the true bounding box. When the pixel point is located within the true bounding box, elements in the 4-dimensional vector corresponding to the pixel point indicate distances from the pixel point to the top, bottom, left and right bounds of the true bounding box respectively. A pixel point located outside the true bounding box may be represented by a vector of 0. The bounding box prediction map contains a 4-dimensional vector of each pixel point in the training image. When the pixel point is located within the true bounding box in the training image, elements in the 4-dimensional vector of the pixel point are distances from the pixel point to the top, bottom, left and right bounds of the predicted bounding box corresponding to the pixel point respectively.

In the training procedure, for each pixel point in the input training image, one predicted bounding box for the training object may be predicted out by utilizing the neural network. In order to reduce the computation load as much as possible on the basis of acquiring as many as possible prediction results of effective pixel points, preferably, it is possible to predict a corresponding predicted bounding box for each pixel point located within the true bounding box.

In one embodiment of the present disclosure, when the bounding box is a square bounding box marking the object, both the true bounding box and the predicted bounding box may be expressed by 4-dimensional vectors. Taking FIG. 2 as an example, for any pixel point located in the true bounding box in the training image (the pixel point may include a pixel point located on a bound of the true bounding box), the training means may determine the first 4-dimensional vector and the second 4-dimensional vector of the pixel point respectively based on the vector of the corresponding pixel point in the training bounding box map and the vector of the corresponding pixel point in the bounding box prediction map. Elements in the first 4-dimensional vector are distances from the pixel point to the top, bottom, left and right bounds of the true bounding box respectively, for example, for the situation as shown in FIG. 2, the true bounding box is located in the bottom-left corner of FIG. 2 and the first 4-dimensional vector may be expressed by $\tilde{x}=(\tilde{x}_t,\tilde{x}_b,\tilde{x}_l,\tilde{x}_r)$; elements in the second 4-dimensional vector represents distances from the pixel point to the top, bottom, left and right bounds of the predicted bounding box (the bounding box located in the top-right corner of FIG. 2) corresponding to the pixel point respectively, for example, for the situation as shown in FIG. 2, the predicted bounding box corresponding to the pixel point is located in the top-right corner of FIG. 2 and the second 4-dimensional vector may be expressed by $x=(x_t,x_b,x_l,x_r)$. As described above, the ratio I/U of the intersection area to the union area may be derived likewise, and the first loss function may be acquired. In one preferred embodiment of the present disclosure, the first loss function may be expressed as $L=-\ln(I/U)$.

The above expression method for the predicted bounding box and the true bounding box is only one example expression manner when the bounding boxes are square bounding boxes but is not limiting of the present disclosure, and those skilled in the art may also employ other expression manners. For example, when the bounding boxes are square bounding boxes, they may also be expressed with parameters of center point coordinate positions, lengths and widths of the bounding boxes, and the ratio of the intersection area to the union area of the predicted bounding box and the true bounding box may also be computed as the first loss function. Furthermore, the same applies when the bounding boxes are not square bounding boxes. For example, when the bounding boxes are circular bounding boxes, they can be expressed with center coordinates and radiuses, and the ratio of the intersection area to the union area of the predicted bounding box and the true bounding box is computed as the first loss function by utilizing similar methods.

When the training means trains the neural network by utilizing the first loss function, it is possible to adjust parameters of the neural network to maximize the ratio of the intersection area to the union area of the predicted bounding box and the true bounding box as much as possible, that is, make I/U as great as possible, and to take values of parameters of the neural network at this time as values of the parameters of the trained neural network. In other words, in one embodiment, when the first loss function correlated with the ratio I/U is expressed as $L=-\ln(I/U)$, it is needed to adjust parameters of the neural network to make the first loss function converge as far as possible so as to get the trained neural network. In another embodiment, a threshold of the number of training rounds may be set for the neural network to determine values of parameters when the number of training rounds of the neural network reaches the set threshold as values of parameters of the trained neural network.

In addition, on the basis of training the neural network by utilizing the first loss function, it is also possible to utilize a second loss function reflecting the difference between a predicted confidence and a true confidence each pixel point in the training image to train this neural network so as to obtain a better training effect. Optionally, the second loss function may be a sigmoid cross-entropy loss function. The predicted confidence is the confidence, predicted by employing the neural network, that each pixel point in the training image belongs to the training object, and the true confidence represents the confidence, marked in advance in the training image, that each pixel point belongs to the training object. For each pixel point in the image, the true confidence may be expressed as 1 (or a positive value) and 0 (or a negative value) which are respectively used for indicating that the pixel point falls within the training object and does not fall within the training object. In the procedure of training the neural network, it is possible to adjust the parameters of the neural network by utilizing the first loss function and the second loss function together to maximize the ratio of the intersection area to the union area of the predicted bounding box and the true bounding box and to minimize the second loss function, so as to obtain the trained neural network. The final loss function of the neural network depends on the weighted sum of two branch loss functions.

In one embodiment, the input layer of the neural network is configured to receive the training image and the true confidence map, and the confidence output layer on the first branch may output the predicted confidence map which represents the confidence, predicted by employing the neural network, that each pixel point in the training image including the training object belongs to the training object, and thus the second loss function may be computed by utilizing the first branch of the constructed neural network. In the procedure of performing object detection by utilizing the neural network constructed by the construction apparatus, at least one pixel point in the confidence map output from the first output layer is utilized to select the corresponding pixel point in the bounding box detection map output from the second output layer, and the relationship between the pixel point and the top, bottom, left and right bounds of the detection bounding box may be obtained according to the vector of the selected corresponding pixel point in the bounding box detection map, so that a more accurate bounding box may be obtained. Hereinafter, a method and apparatus of performing object detection by utilizing the neural network will be described specifically in conjunction with attached drawings. Thus, by creating the neural network in such a setting that there are two branches and two output layers thereof are connected with two different intermediate layers respectively, prediction results of the first output layer and the second output layer may be combined, so that the object detection is performed more accurately.

Therefore, the neural network in the embodiment of the present disclosure can make the branch of the bounding box output layer obtains a larger receptive field than the branch of the confidence output layer upon the regression of the bounding box, so that the branch of the bounding box output layer extracts the bounding box from the confidence map by employing a bottom-up strategy, thereby improving the efficiency of training and detection of the neural network effectively.

Figure 9:
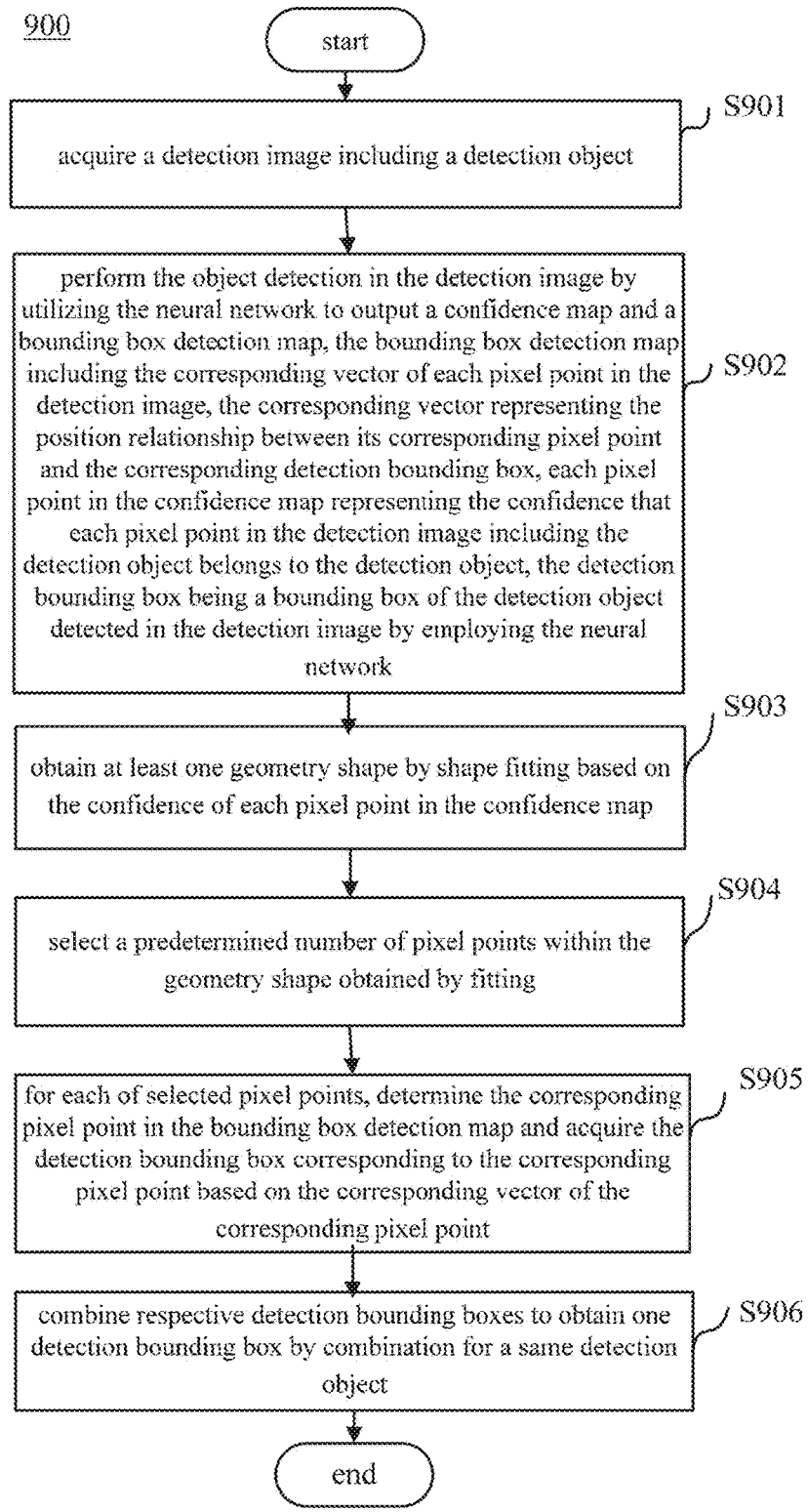
FIG. 9 schematically shows a flow chart of an object detection method based on a neural network according to an embodiment of the present disclosure.

In the following, an object detection method based on a neural network according to an embodiment of the present disclosure will be described in detail with reference to FIG. 9. FIG. 9 schematically shows a flow chart of an object detection method based on a neural network according to an embodiment of the present disclosure.

As shown in FIG. 9, the object detection method 900 includes a step S901 of acquiring a detection image including a detection object.

At step S902, the object detection is performed in the detection image by utilizing the neural network to output a confidence map and a bounding box detection map, the bounding box detection map including the corresponding vector of each pixel point in the detection image, the corresponding vector representing the position relationship between its corresponding pixel point and the corresponding detection bounding box, each pixel point in the confidence map representing the confidence that each pixel point in the detection image including the detection object belongs to the detection object, the detection bounding box being a bounding box of the detection object detected in the detection image by employing the neural network.

When the pixel point is located within the corresponding detection bounding box of the detection object, the vector is a 4-dimensional vector, and elements in the 4-dimensional vector are distances from the pixel point to the top, bottom, left and right bounds of the corresponding detection bounding box.

At a step S903, at least one geometry shape is obtained by shape fitting based on the confidence of each pixel point in the confidence map.

In the step, it is possible to set a predetermined threshold for the confidence, to determine multiple pixel points whose confidence is greater than the predetermined threshold therefrom and then to obtain a geometry shape matching to the shape of the detection object by fitting based on the multiple pixel points. For example, when the detection object is a face, the ellipse fitting may be performed according to the pixel points determined by the predetermined threshold to obtain an ellipse matching to the face. When the detection object is a vehicle or other items, it may also be fitted into a rectangle or other shapes.

At a step S904, a predetermined number of pixel points are selected within the geometry shape obtained by fitting.

In the step, it is possible to perform computation for each of pixel points within the geometry shape obtained by fitting. However, in order to reduce the computation load and improve the detection efficiency, it is possible to extract one or several pixel points within the geometry shape and to perform computation of subsequent steps. For example, within the ellipse fitted by the face detection mentioned in the above embodiment, it is possible to select one or more points of the center point, the midpoint of the long/short axis and the like of the ellipse to perform computation.

At a step S905, for each of selected pixel points, the corresponding pixel point in the bounding box detection map is determined and the detection bounding box corresponding to the corresponding pixel point is acquired based on the corresponding vector of the corresponding pixel point.

In the present step, each of the selected pixel point in the confidence map may correspond to a certain pixel point in the input detection image, and the corresponding vector of this pixel point in the corresponding bounding box detection map may be obtained therefrom. According to the position relationship between the corresponding vector and the corresponding detection bounding box (for example, when the pixel point is located within the corresponding detection bounding box, elements in the corresponding vector of the pixel point are distances from the pixel point to the top, bottom, left and right bounds of the corresponding detection bounding box), the corresponding detection bounding box of the pixel point is obtained.

At a step S906, respective detection bounding boxes are combined to obtain one detection bounding box by combination for a same detection object.

For a same detection object, the detection bounding boxes obtained in the step S905 may be more than one. More clearly, at the step S905, respective detection bounding boxes determined by respective corresponding pixel points in the corresponding bounding box detection map may not be completely coincident. Thus, in the step, these detection bounding boxes may be combined to obtain one detection bounding box by combination for a same detection object. Optionally, it is possible to combine respective detection bounding boxes by utilizing the non-maximal suppression method so as to eliminate excess bounding boxes. The one detection bounding box obtained finally by combination represents one detection object detected in the image, and the detection bounding box is one accurate result of a detection bounding box.

Optionally, the neural network used by the object detection method of the embodiment of the present disclosure may include at least one input layer, n intermediate layers and two output layers, in which n is a positive integer greater than or equal to 2, and the two output layers include a confidence output layer for outputting the confidence map and a bounding box output layer for outputting the bounding box detection map.

The m-th intermediate layer of the neural network is connected to the confidence output layer in cascade, the n-th intermediate layer is connected to the bounding box output layer in cascade, and m is less than n.

In one embodiment, the neural network may be realized by the neural network shown in FIG. 6. The m-th intermediate layer of the neural network is connected to the confidence output layer in cascade on the first branch of the neural network via a convolution layer, a up-sample layer and a crop layer, feature extraction and adjustment are performed on the feature map output from the m-th intermediate layer through the convolution layer, the up-sample layer and the crop layer, and the confidence map is output via the confidence output layer. The n-th intermediate layer of the neural network is connected to the bounding box output layer in cascade on the second branch of the neural network via a convolution layer, a up-sample layer, a crop layer and a rectified linear unit layer, feature extraction and adjustment are performed on the feature map output from the n-th intermediate layer through the convolution layer, the up-sample layer, the crop layer and the rectified linear unit layer, and the bounding box detection map is output via the bounding box output layer. After the adjustment by the rectified linear unit layer, the vector of the pixel point located outside the corresponding detection bounding box is adjusted into a vector of 0, and the corresponding vector of the pixel point located within the corresponding detection bounding box is a vector not less than 0.

On the other hand, optionally, the neural network used in the embodiment of the present disclosure may be trained by utilizing a first loss function which reflects a ratio of the intersection area to the union area of a predicted bounding box and a true bounding box, the predicted bounding box being a bounding box of a training object predicted in a training image including the training object by employing the neural network and the true bounding box being a bounding box of the training object marked in advance in the training image.

In one embodiment, the input layer of the neural network may receive the training image and the training bounding box map, and the bounding box output layer of the neural network outputs the bounding box prediction map. The training bounding box map contains a 4-dimensional vector of each pixel point in the training image, and the 4-dimensional vector indicates the position relationship between its corresponding pixel point and the true bounding box. When the pixel point is located within the true bounding box, elements in the 4-dimensional vector corresponding to the pixel point indicate distances from the pixel point to the top, bottom, left and right bounds of the true bounding box respectively. A pixel point located outside the true bounding box may be represented by a vector of 0. The bounding box prediction map contains a 4-dimensional vector of each pixel point located in the training image. When the pixel point is located within the true bounding box in the training image, elements in the 4-dimensional vector of the pixel point are distances from the pixel point to the top, bottom, left and right bounds of the predicted bounding box corresponding to the pixel point respectively. It is possible to compute the first loss function through the second branch of the neural network according to the training bounding box map and the bounding box prediction map.

Optionally, the neural network used in the embodiment of the present disclosure may be trained by utilizing a first loss function which reflects a ratio of the intersection area to the union area of a predicted bounding box and a true bounding box and a second loss function which reflects the difference between a predicted confidence and a true confidence of each pixel point in the training image, the predicted bounding box being a bounding box of a training object predicted in a training image including the training object by employing the neural network, the true bounding box being a bounding box of the training object marked in advance in the training image, the predicted confidence being the confidence, predicted by employing the neural network, that each pixel point in the training image belongs to the training object, and the true confidence representing the confidence, marked in advance in the training image, that each pixel point belongs to the training object. In the procedure of training the neural network, it is possible to adjust the parameters of the neural network by utilizing the first loss function and the second loss function together. The final loss function of the neural network depends on the weighted sum of two branch loss functions.

Therefore, the object detection method based on a neural network of the embodiment of the present disclosure can obtain accurate and effective object location results, and thus the detection efficiency is high; meanwhile, there is no need to change the size of the input image, and thus the adaptability is stronger and it may be suitable for different sizes of objects, especially for an object of a small size, detection performed on it may also achieve a better effect. In addition, since the corresponding vector map of the corresponding detection bounding box may be generated for each pixel point in the embodiment of the present disclosure, corresponding different detection bounding boxes may be obtained for pixel points located within different detection objects. Thus, the embodiment of the present disclosure can process multiple detection objects in the detection image simultaneously.

Figure 10:
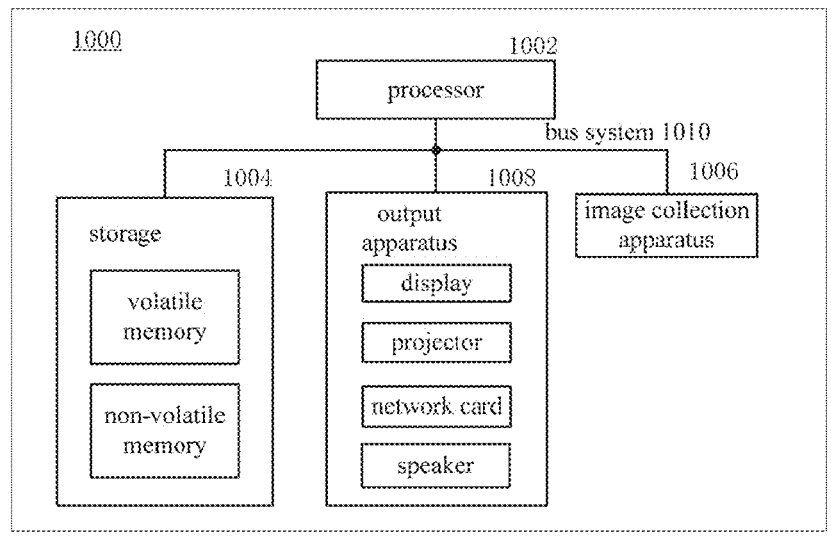
FIG. 10 schematically shows a schematic block diagram of an object detection apparatus based on a neural network according to an embodiment of the present disclosure.

In the following, an object detection apparatus based on a neural network according to an embodiment of the present disclosure will be described with reference to FIG. 10. FIG. 10 shows an object detection apparatus based on a neural network according to an embodiment of the present disclosure. The object detection apparatus may be a computer or a server equipped with an image collection apparatus.

As shown in FIG. 10, an object detection device 1000 includes one or more processors 1002, storage 1004, an image collection apparatus 1006 and an output apparatus 1008, and these components are interconnected via a bus system 1010 and/or a connection mechanism of other form (not shown). It should be noted that the components and the structure of the object detection device 1000 shown in FIG. 10 are only exemplary but not limiting, and depending on requirements, the object detection device 1000 may also have other components and structure.

The processor 1002 may be a Center Processing Unit (CPU) or a processing unit of other form having data processing capability and/or instruction execution capability, and may control other components in the object detection device 1000 to execute desired functions.

The storage 1004 may include one or more computer program products which may include computer readable storage media of various forms, for example, volatile memories and/or non-volatile memories. The volatile memories may include for example a Random Access Memory (RAM) and/or a cache, etc. The non-volatile memories may include for example a Read Only Memory (ROM), a hard disk, a flash memory, etc. There may be stored on the computer readable storage media one or more computer program instructions which may be executed by the processor 1002 to implement steps of: acquiring a detection image including a detection object; performing the object detection in the detection image by utilizing the neural network to output a confidence map and a bounding box detection map, the bounding box detection map including the corresponding vector of each pixel point in the detection image, the corresponding vector representing the position relationship between its corresponding pixel point and the corresponding detection bounding box, each pixel point in the confidence map representing the confidence that each pixel point in the detection image including the detection object belongs to the detection object, the detection bounding box being a bounding box of the detection object detected in the detection image by employing the neural network; obtaining at least one geometry shape by shape fitting based on the confidence of each pixel point in the confidence map; selecting a predetermined number of pixel points within the geometry shape obtained by fitting; for each of selected pixel points, determining the corresponding pixel point in the bounding box detection map and acquiring the detection bounding box corresponding to the corresponding pixel point based on the corresponding vector of the corresponding pixel point; and combining respective detection bounding boxes to obtain one accurate detection bounding box by combination for a same detection object.

The image collection apparatus 1006 is used for collecting the training image with the training object and storing the photographed training image in the storage 1004 for other components to use. Of course, it is also possible to collect the training image by using other image collection devices and to send the collected training image to the object detection device 1000. In this case, the image collection apparatus 1006 may be omitted.

The output apparatus 1008 may output various information, for example the image information, the object detection result, to outside (for example, a user), and may include one or more of a display, a speaker, etc.

Figure 11:
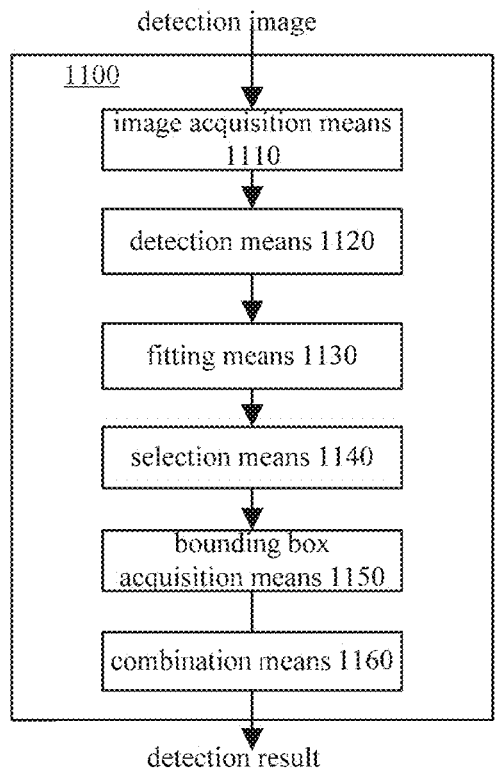
FIG. 11 schematically shows a schematic structural block diagram of an object detection apparatus based on a neural network according to an embodiment of the present disclosure.

In the following, an object detection apparatus based on a neural network according to an embodiment of the present disclosure will be described with reference to FIG. 11. FIG. 11 shows a schematic structural block diagram of an object detection apparatus based on a neural network according to an embodiment of the present disclosure.

As shown in FIG. 11, the object detection apparatus 1100 includes: an image acquisition means 1110 configured to acquire a detection image including a detection object; a detection means 1120 configured to perform the object detection in the detection image by utilizing the neural network to output a confidence map and a bounding box detection map, the bounding box detection map including the corresponding vector of each pixel point in the detection image, the corresponding vector representing the position relationship between its corresponding pixel point and the corresponding detection bounding box, each pixel point in the confidence map representing the confidence that each pixel point in the detection image including the detection object belongs to the detection object, the detection bounding box being a bounding box of the detection object detected in the detection image by employing the neural network; a fitting means 1130 configured to obtain at least one geometry shape by shape fitting based on the confidence of each pixel point in the confidence map; a selection means 1140 configured to select a predetermined number of pixel points within the geometry shape obtained by fitting; a bounding box acquisition means 1150 configured to, for each of selected pixel points, determine the corresponding pixel point in the bounding box detection map and to acquire the detection bounding box corresponding to the corresponding pixel point based on the corresponding vector of the corresponding pixel point; and a combination means 1160 configured to combine respective detection bounding boxes to obtain one accurate detection bounding box by combination for a same detection object.

When the pixel point is located within the corresponding bounding box of the detection object, the vector corresponding to the pixel point is a 4-dimensional vector, and elements in the 4-dimensional vector are distances from the pixel point to the top, bottom, left and right bounds of the corresponding detection bounding box.

When the fitting means 1130 obtains the geometry shape by shape fitting, it is possible to set a predetermined threshold for the confidence, to determine multiple pixel points whose confidence is greater than the predetermined threshold therefrom and then to obtain a geometry shape matching to the shape of the detection object by fitting based on the multiple pixel points. For example, when the detection object is a face, the ellipse fitting may be performed according to the pixel points determined by the predetermined threshold to obtain an ellipse matching to the face. When the detection object is a vehicle or other items, it may also be fitted into a rectangle or other shapes.

When the selection means 1140 selects a predetermined number of pixel points within the geometry shape obtained by fitting, it is possible to perform computation for each of pixel points within the geometry shape obtained by fitting. However, in order to reduce the computation load and improve the detection efficiency, it is possible to extract one or several pixel points within the geometry shape and to perform computation of subsequent steps. For example, within the ellipse fitted by the face detection mentioned in the above embodiment, it is possible to select one or more points of the center point, the midpoint of the long/short axis and the like of the ellipse to perform computation.

Subsequently, by the bounding box acquisition means 1150, each of the selected pixel point in the confidence map may correspond to a certain pixel point in the input detection image, and the corresponding vector of this pixel point in the corresponding bounding box detection map may be obtained therefrom. According to the corresponding vector, the corresponding detection bounding box of the pixel point is obtained.

For a same detection object, the detection bounding boxes obtained may be more than one. When the detection bounding boxes corresponding to a same detection object are multiple, the combination means 1160 may combine respective detection bounding boxes to obtain one accurate detection bounding box by combination for the same detection object. At this time, the combination means 1160 may combine respective detection bounding boxes by utilizing the non-maximal suppression method so as to eliminate excess bounding boxes. When each detection object corresponds to only one detection bounding box, the combination means 1160 may be omitted.

The neural network used by the object detection apparatus of the embodiment of the present disclosure may include at least one input layer, n intermediate layers and two output layers, in which n is a positive integer greater than or equal to 2, and the two output layers include a confidence output layer for outputting the confidence map and a bounding box output layer for outputting the bounding box detection map.

The m-th intermediate layer of the neural network is connected to the confidence output layer in cascade, the n-th intermediate layer is connected to the bounding box output layer in cascade, and m is less than n.

In one embodiment, the neural network may be realized by the neural network shown in FIG. 6. The m-th intermediate layer of the neural network is connected to the confidence output layer in cascade on the first branch of the neural network via a convolution layer, a up-sample layer and a crop layer, feature extraction and adjustment are performed on the feature map output from the m-th intermediate layer through the convolution layer, the up-sample layer and the crop layer, and the confidence map is output via the confidence output layer. The n-th intermediate layer of the neural network is connected to the bounding box output layer in cascade on the second branch of the neural network via a convolution layer, a up-sample layer, a crop layer and a rectified linear unit layer, feature extraction and adjustment are performed on the feature map output from the n-th intermediate layer through the convolution layer, the up-sample layer, the crop layer and the rectified linear unit layer, and the bounding box detection map is output via the bounding box output layer. After the adjustment by the rectified linear unit layer, the vector of the pixel point located outside the corresponding detection bounding box is adjusted into a vector of 0, and the corresponding vector of the pixel point located within the corresponding detection bounding box is a vector not less than 0.

The neural network used in the embodiment of the present disclosure may be trained by utilizing a first loss function which reflects a ratio of the intersection area to the union area of a predicted bounding box and a true bounding box, the predicted bounding box being a bounding box of a training object predicted in a training image including the training object by employing the neural network and the true bounding box being a bounding box of the training object marked in advance in the training image.

In one embodiment, the input layer of the neural network may receive the training image and the training bounding box map, and the bounding box output layer of the neural network outputs the bounding box prediction map. The training bounding box map contains a 4-dimensional vector of each pixel point in the training image, and the 4-dimensional vector indicates the position relationship between its corresponding pixel point and the true bounding box. When the pixel point is located within the true bounding box, elements in the 4-dimensional vector corresponding to the pixel point indicate distances from the pixel point to the top, bottom, left and right bounds of the true bounding box respectively. A pixel point located outside the true bounding box may be represented by a vector of 0. The bounding box prediction map contains a 4-dimensional vector of each pixel point located in the training image. When the pixel point is located within the true bounding box in the training image, elements in the 4-dimensional vector of the pixel point are distances from the pixel point to the top, bottom, left and right bounds of the predicted bounding box corresponding to the pixel point respectively. It is possible to compute the first loss function through the second branch of the neural network according to the training bounding box map and the bounding box prediction map.

Optionally, the neural network used in the embodiment of the present disclosure may be trained by utilizing a first loss function which reflects a ratio of the intersection area to the union area of a predicted bounding box and a true bounding box and a second loss function which reflects the difference between a predicted confidence and a true confidence of each pixel point in the training image, the predicted bounding box being a bounding box of a training object predicted in a training image including the training object by employing the neural network, the true bounding box being a bounding box of the training object marked in advance in the training image, the predicted confidence being the confidence, predicted by employing the neural network, that each pixel point in the training image belongs to the training object, and the true confidence representing the confidence, marked in advance in the training image, that each pixel point belongs to the training object. In the procedure of training the neural network, it is possible to adjust the parameters of the neural network by utilizing the first loss function and the second loss function together. The final loss function of the neural network depends on the weighted sum of two branch loss functions.

Therefore, the object detection apparatus based on a neural network of the embodiment of the present disclosure can obtain accurate and effective object location results, and thus the detection efficiency is high; meanwhile, there is no need to change the size of the input image, and thus the adaptability is stronger and it may be suitable for different sizes of objects, especially for an object of a small size, detection performed on it may also achieve a better effect. In addition, multiple detection objects in the detection image can be processed simultaneously.

Figure 12:
FIG. 12 shows examples in which the face detection is performed by the object detection method and apparatus according to an embodiment of the present disclosure.

FIG. 12 shows examples in which the face detection is performed by utilizing the object detection method and apparatus according to an embodiment of the present disclosure. It can be seen therefrom that face object detection bounding boxes obtained by using the method and apparatus of embodiments of the present disclosure are accurately located, have the strong adaptability to face objects of different sizes, and can also achieve a better detection result for a partially occluded face.

Figure 13:
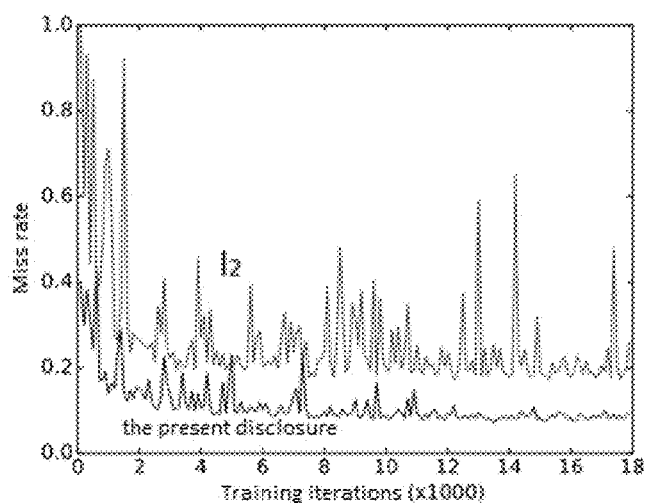
FIG. 13 (*a*), (*b*) respectively show the comparison between the neural network trained by utilizing the loss function of an embodiment of the present disclosure and the neural network trained by utilizing the $L_2$ loss function in aspects of the miss rate and the recall rate of the object detection.
Figure 13:
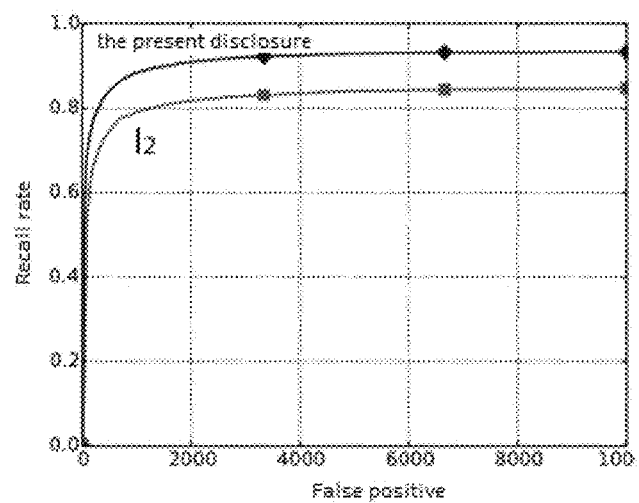

FIG. 13 (a), (b) respectively show the comparison between the object detection method utilizing the above-mentioned first loss function and the neural network structure of two output layers and the object detection method utilizing the $l_2$ loss function and employing the same neural network structure in aspects of the miss rate and the recall rate. It can be seen from FIG. 13 (a) that with the number of training rounds of the neural network increasing, the neural network trained using the loss function corresponding to the embodiments of the present disclosure converges more quickly and more stably, while the neural network trained employing the $l_2$ loss function converges very slowly and unstably. It can be seen from FIG. 13(b) that the effect of the working performance curve (ROC) that the object detection is performed by training the neural network according to embodiments of the present disclosure using the loss function according to embodiments of the present disclosure is better.

Figure 14:
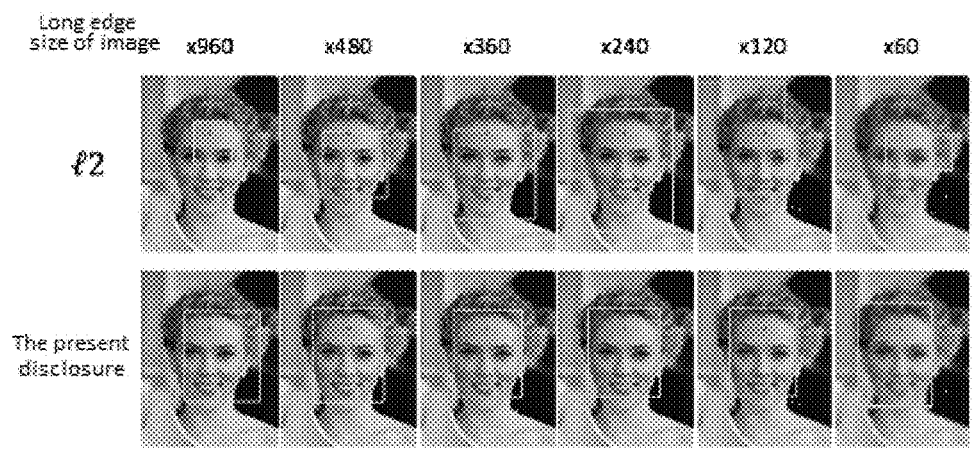
FIG. 14 shows a schematic diagram of comparison between the result of face object detection based on the neural network trained by utilizing the $L_2$ loss function and the result of face object detection based on the neural network trained by utilizing the first loss function of a first embodiment of the present disclosure for different pixels of a detection image.

FIG. 14 shows cases of performing the face object detection utilizing the neural network trained by the $l_2$ loss function and the neural network trained by the first loss function when sizes of the detection images are respectively 60 pixels to 960 pixels for the long edge sizes of the images. It can be seen that with the change of the size of the image, the capability to judge the detection bounding boxes of the detection method using the neural network trained based on the $l_2$ loss function changes, and it has no capability to judge for a face of a small size (60 pixels) basically. In contrast, the detection method using the neural network trained based on the loss function of embodiments of the present disclosure has a good judgment for each of face detection objects of different sizes.

Figure 15:
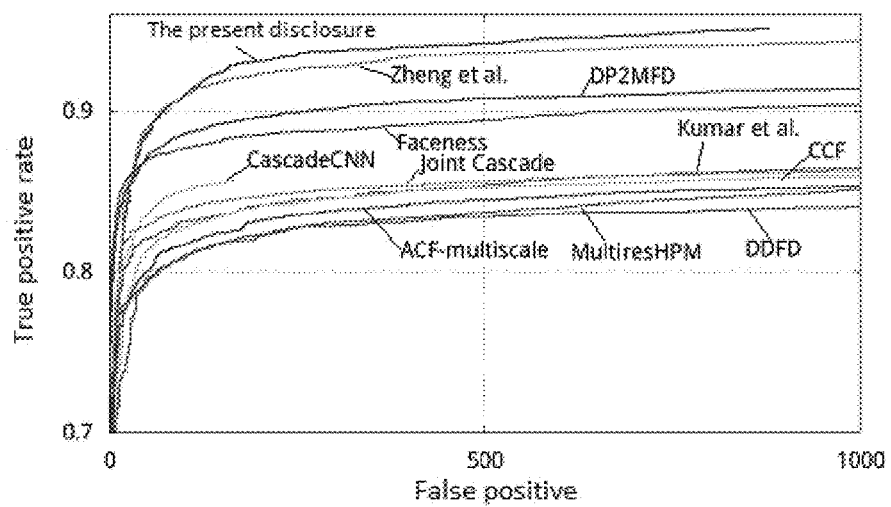
FIG. 15 shows a schematic diagram of horizontal comparison between a face object detection method of an embodiment of the present disclosure and other detection methods.

FIG. 15 shows a schematic diagram of horizontal comparison between a face object detection method of an embodiment of the present disclosure and other detection methods. It can be seen that the performance of the object detection method employed by the embodiment of the present disclosure is improved significantly as compared with many kinds of methods in the prior art.

The basic principles of the present disclosure have been described above in conjunction with specific embodiments. However, it is to be noted that the advantage, predominance, effect and so on mentioned in the present disclosure are merely exemplary but not limiting, and should not be interpreted to be necessary for the embodiments of the present disclosure. In addition, the specific details are disclosed above only for the purpose of illustration and convenience of understanding but not for limitation. These details will not restrict the present disclosure to be implemented by employing these details necessarily.

The block diagrams of the devices, means, apparatus and system involved in the present disclosure are only illustrative examples and not intended to require or imply that they should be connected, arranged or configured in the manner shown in the diagrams. As will be realized by those skilled in the art, these devices, means, apparatus and system can be connected, arranged or configured in any way. The terms such as "including", "comprising", "having" or the like are open-meaning words, refer to "including but not limited to", and can be exchanged therewith. The terms of "or" and "and" used herein refer to "and/or" and can be exchanged therewith unless the context explicitly indicates not. The terms of "such as" used herein refer to "such as but not limited to" and can be exchanged therewith.

In addition, as used herein, the word of "or" used in the list of items beginning with "at least one of" indicates separate listing so that the list of for example "at least one of A, B or C" means A or B or C, AB or AC or BC, or ABC (that is, A and B and C). In addition, the term of "exemplary" does not indicate that the example in question is preferable or better than other examples.

It is also to be noted that in the device and method of the present disclosure, the parts or the steps can be divided and/or re-combined. The division and/or recombination should be considered as equivalent solutions of the present disclosure.

Without departing from the techniques defined in the claims, various change, replacement or alternation to the techniques described herein can be made. In addition, the scope of the claims of the present disclosure is not limited to the specific aspects of process, machine, manufacturing, composition of event, measure, method and action as described above. The process, machine, manufacturing, composition of event, measure, method and action which are currently existing or to be developed in the future and can perform substantially the same function or achieve substantially the same effect as the corresponding aspect as described here can be employed. Therefore, such process, machine, manufacturing, composition of event, measure, method and action are within the scope of the appended claims.

The above description of the aspects of the present disclosure is provided to enable those skilled in the art to make or use the present disclosure. Various modifications to these aspects are obvious to those skilled in the art and the general principles defined here can be applied to other aspects without departing from the scope of the present disclosure. Therefore, the present disclosure is not intended to be restricted to the aspects disclosed here and should accord to the broadest scope consistent with the principles and novel features disclosed here.

The above description is given for the purpose of illustration and explanation. In addition, the description is not intended to restrict the embodiments of the present disclosure to the form disclosed here. Although multiple exemplary aspects and embodiments have been discussed, those skilled in the art can conceive of other alternation, modification, change, addition and sub-combination thereof.

What is claimed is:

1. A training method of a neural network for object detection, comprising:
   inputting a training image including a training object to the neural network to obtain a predicted bounding box of the training object;
   acquiring a first loss function according to a ratio of an intersection area to a union area of the predicted bounding box and a true bounding box, wherein the true bounding box is a bounding box of the training object marked in advance in the training image; and
   adjusting parameters of the neural network by utilizing at least the first loss function to train the neural network;
   wherein the first loss function is a negative value of a natural logarithm of the ratio of the intersection area to the union area of the predicted bounding box and the true bounding box;
   wherein the method further comprising:
   selecting a second loss function reflecting a difference between a predicted confidence and a true confidence of each pixel point in the training image, the predicted confidence being the confidence, predicted by employing the neural network, that a certain pixel point in the training image belongs to the training object, and the true confidence representing the confidence, marked in advance in the training image, that the certain pixel point belongs to the training object,
   wherein said adjusting the parameters of the neural network by utilizing at least the first loss function to train the neural network comprises:
   adjusting the parameters of the neural network by utilizing the first loss function and the second loss function to maximize a ratio of an intersection area to an union area of the predicted bounding box and the true bounding box and to minimize the second loss function so as to obtain the trained neural network.

2. The training method according to claim 1, wherein said adjusting the parameters of the neural network by utilizing at least the first loss function to train the neural network comprises:
   adjusting the parameters of the neural network by utilizing at least the first loss function to maximize the ratio of the intersection area to the union area of the predicted bounding box and the true bounding box.

3. The training method according to claim 1, wherein said adjusting the parameters of the neural network by utilizing at least the first loss function to train the neural network comprises:
   determining values of the parameters when a number of training rounds reaches to a set threshold as values of parameters of the trained neural network.

4. The training method according to claim 1, wherein said acquiring the first loss function according to the ratio of the intersection area to the union area of the predicted bounding box and the true bounding box comprises:
   for at least one pixel point located within the true bounding box in the training image, determining a first 4-dimensional vector and a second 4-dimensional vector, wherein elements in the first 4-dimensional vector are distances from the pixel point to the top, bottom, left and right bounds of the true bounding box respectively, and elements in the second 4-dimensional vector represent distances from the pixel point to the top, bottom, left and right bounds of the predicted bounding box corresponding to the pixel point respectively;
   acquiring an area of the true bounding box according to the first 4-dimensional vector;
   acquiring an area of the predicted bounding box according to the second 4-dimensional vector;
   acquiring an intersection area of the predicted bounding box and the true bounding box according to the first 4-dimensional vector and the second 4-dimensional vector; and taking a difference between a sum of the acquired area of the predicted bounding box and the acquired area of the true bounding box and the acquired intersection area as the union area.

5. The training method according to claim 1, wherein the neural network comprises at least one input layer, n intermediate layers and two output layers, wherein n is a positive integer greater than or equal to 2, and the two output layers comprise a confidence output layer and a bounding box output layer, wherein in a training step, the input layer is configured to receive the training image, the confidence output layer is configured to output a predicted confidence map which represents the confidence, predicted by employing the neural network, that each pixel point in the training image including the training object belongs to the training object, the bounding box output layer is configured to output a bounding box prediction map which contains a 4-dimensional vector of each pixel point located in the training image, wherein, when the pixel point is located within the true bounding box in the training image, elements in the 4-dimensional vector of the pixel point are distances from the pixel point to the top, bottom, left and right bounds of the predicted bounding box corresponding to the pixel point.

6. The training method according to claim 5, further comprising:

for each input training image, inputting to the input layer a true confidence map and a training bounding box map whose sizes are same as that of the training image, wherein the training bounding box map contains a 4-dimensional vector of each pixel point located in the training image, wherein, when the pixel point is located within the true bounding box in the training image, elements in the 4-dimensional vector corresponding to the pixel point are distances from the pixel point to the top, bottom, left and right bounds of the true bounding box, and each pixel point in the true confidence map represents the confidence that the corresponding pixel in the training image belongs to the training object.

7. The training method according to claim 5, wherein the m-th intermediate layer of the neural network is connected to the confidence output layer in cascade, the n-th intermediate layer is connected to the bounding box output layer in cascade, and m is less than n.

* * * * *